United States Patent
Tsai et al.

(10) Patent No.: US 11,249,587 B2
(45) Date of Patent: Feb. 15, 2022

(54) TOUCH PANEL AND TOUCH DISPLAY APPARATUS

(71) Applicant: HIMAX TECHNOLOGIES LIMITED, Tainan (TW)

(72) Inventors: Cheng-Hung Tsai, Tainan (TW); Chin-Yuan Chiang, Tainan (TW); Wai-Pan Wu, Tainan (TW); Shen-Feng Tai, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 16/379,794

(22) Filed: Apr. 10, 2019

(65) Prior Publication Data

US 2020/0326827 A1 Oct. 15, 2020

(51) Int. Cl.
*G06F 3/041* (2006.01)
*G06F 3/0488* (2022.01)

(52) U.S. Cl.
CPC ........ *G06F 3/04164* (2019.05); *G06F 3/0412* (2013.01); *G06F 3/04886* (2013.01)

(58) Field of Classification Search
CPC ...... G06F 3/0412; G06F 3/044; G06F 3/0416; G02F 1/134309; G02F 1/13338
See application file for complete search history.

(56) References Cited

U.S. PATENT DOCUMENTS

| | | | | | |
|---|---|---|---|---|---|
| 8,553,013 | B2* | 10/2013 | Kim | ...................... | G06F 3/0412 178/18.06 |
| 2014/0176465 | A1* | 6/2014 | Ma | .......................... | G06F 3/041 345/173 |
| 2014/0313437 | A1* | 10/2014 | Huang | .................... | G06F 3/044 349/12 |
| 2015/0145821 | A1* | 5/2015 | Kim | ....................... | G06F 3/0412 345/174 |
| 2015/0185939 | A1* | 7/2015 | Han | ........................ | G06F 3/044 345/173 |
| 2015/0378486 | A1* | 12/2015 | Yu | .......................... | G06F 3/0412 345/174 |

(Continued)

FOREIGN PATENT DOCUMENTS

| | | |
|---|---|---|
| CN | 105224116 A | 1/2016 |
| TW | 201631457 A | 9/2016 |
| TW | 201837673 A | 10/2018 |

*Primary Examiner* — Yuzhen Shen

(74) *Attorney, Agent, or Firm* — CKC & Partners Co., LLC

(57) ABSTRACT

A touch panel includes a first electrode layer and a second electrode layer. The first electrode layer has transmitting electrodes arranged in transmitting channels and traces respectively coupled to the transmitting channels. The second electrode layer has receiving electrodes arranged in receiving channels. At least one of the traces, the transmitting channels and one of the receiving channels in proximity of the traces form touch detection blocks that respectively correspond to the transmitting channels. For each touch detection block, in a circle area overlapped with at least one of the traces and substantially in the touch detection block corresponding to one of the transmitting channels, a summation of areas of the corresponded transmitting channel and the trace coupled to the corresponded transmitting channel is substantially larger than a summation of areas of the other transmitting channels and the other traces.

16 Claims, 22 Drawing Sheets

(56) References Cited

U.S. PATENT DOCUMENTS

| | | | | |
|---|---|---|---|---|
| 2016/0363998 A1* | 12/2016 | Colgate | .................. | G06F 3/016 |
| 2017/0003822 A1* | 1/2017 | Zhao | ..................... | G06F 3/0412 |
| 2019/0163299 A1* | 5/2019 | Nakanishi | ............. | G06F 3/0416 |
| 2019/0220114 A1* | 7/2019 | Shu | ....................... | G06F 3/0446 |
| 2019/0339816 A1* | 11/2019 | Hsu | ....................... | G06F 3/0445 |
| 2020/0073512 A1* | 3/2020 | Jiang | .................... | G06F 3/0445 |
| 2020/0379605 A1* | 12/2020 | Zhang | .................. | G06F 3/0443 |

* cited by examiner

TOUCH PANEL AND TOUCH DISPLAY APPARATUS

BACKGROUND

Field of the Invention

The invention relates to a touch panel and a touch display apparatus, and more particularly, to a touch panel with thin border and improved edge detection and a touch display apparatus having the same.

Description of Related Art

Input devices of electrical products have been changed from conventional keyboards and mice to touch panels so as to cope with the demands for convenience, miniaturization, and being user-friendly. At present, the touch panels can be generally classified into capacitive, resistive, optical, acoustic-wave and electromagnetic touch panels. Among these touch panels, the capacitive touch panels are most widely applied to electronic devices. On the other hand, electronic devices with slim border or even borderless designs have been taken into consideration for artistic and usage demands. Manufacturing of design slim border or borderless electronic devices equipped with touch panels has become a trend in the related industries.

SUMMARY

An objective of the invention is to provide a touch panel with thin border and improved edge detection. Another objective of the invention is to provide a touch display apparatus having a touch panel with thin border and improved edge detection.

One aspect of the invention is directed to a touch panel, which includes a first electrode layer and a second electrode layer. The first electrode layer has transmitting electrodes arranged in transmitting channels and traces respectively coupled to the transmitting channels. The second electrode layer has receiving electrodes arranged in receiving channels. At least one of the traces, the transmitting channels and one of the receiving channels in proximity of the traces form touch detection blocks that respectively correspond to the transmitting channels. For each touch detection block, in a circle area overlapped with at least one of the traces and substantially in the touch detection block corresponding to one of the transmitting channels, a summation of areas of the corresponded transmitting channel and the trace coupled to the corresponded transmitting channel is substantially larger than a summation of areas of the other transmitting channels and the other traces. A diameter of the circle area is substantially the same as a width of the touch detection block.

In accordance with one or more embodiments of the invention, the diameter of the circle area is at least 2.5 millimeters.

In accordance with one or more embodiments of the invention, the diameter of the circle area is substantially 5 millimeters.

In accordance with one or more embodiments of the invention, one or more of the traces are arranged in a touch active area of the touch panel.

In accordance with one or more embodiments of the invention, widths of the one or more of the traces arranged in a direction from a nearest edge of the touch active area to a farthest edge of the touch active area opposite to the nearest edge are non-increasing.

In accordance with one or more embodiments of the invention, the traces are all arranged in the touch active area of the touch panel.

In accordance with one or more embodiments of the invention, the one or more traces in the touch active area are one or more transparent traces.

In accordance with one or more embodiments of the invention, the transmitting electrodes and the receiving electrodes are transparent electrodes.

Another aspect of the invention is directed to a touch panel, which includes a first electrode layer and a second electrode layer. The first electrode layer has transmitting electrodes arranged in first and second transmitting channels and first traces respectively coupled to the first transmitting channels. The second electrode layer has receiving electrodes arranged in receiving channels. At least one of the first traces, the first and second transmitting channels and one of the receiving channels in proximity of the first traces form first touch detection blocks that respectively correspond to the first transmitting channels. For each first touch detection block, in a first circle area overlapped with at least one of the first traces and substantially in the first touch detection block corresponding to one of the first transmitting channels, a summation of areas of the first transmitting channel and the first trace coupled to the corresponded first transmitting channel is substantially larger than a summation of areas of the other first transmitting channels, the second transmitting channels and the other first traces. A diameter of the first circle area is substantially the same as a width of the first touch detection block.

In accordance with one or more embodiments of the invention, the first electrode layer further has second traces respectively coupled to the second transmitting channels and opposite to the first traces with respect to the receiving channels. At least one of the second traces, the first and second transmitting channels and another one of the receiving channels in proximity of the second traces form second touch detection blocks that respectively correspond to the second transmitting channels. For each second touch detection block, in a second circle area overlapped with at least one of the second traces and substantially in the second touch detection block corresponding to one of the second transmitting channels, a summation of areas of the second transmitting channel and the second trace coupled to the corresponded second transmitting channel is substantially larger than a summation of areas of the first transmitting channels, the other second transmitting channels and the other second traces. A diameter of the second circle area is substantially the same as a width of the second touch detection block.

In accordance with one or more embodiments of the invention, each of the diameter of the first circle area and the diameter of the second circle area is at least 2.5 millimeters.

In accordance with one or more embodiments of the invention, each of the diameter of the first circle area and the diameter of the second circle area is substantially 5 millimeters.

In accordance with one or more embodiments of the invention, the first and second transmitting channels are alternately arranged transmitting channels.

In accordance with one or more embodiments of the invention, one or more of the first traces and one or more of the second traces are arranged in a touch active area of the touch panel.

In accordance with one or more embodiments of the invention, widths of the one or more of the first traces arranged in a first direction from a first edge of the touch active area nearest to the first traces to a second edge of the touch active area nearest to the second traces are non-increasing, and widths of the one or more of the second traces arranged in a second direction from the second edge of the touch active area to the first edge of the touch active area are non-increasing.

In accordance with one or more embodiments of the invention, the first and second traces are all arranged in the touch active area of the touch panel.

In accordance with one or more embodiments of the invention, the one or more first traces and the one or more first traces in the touch active area are transparent traces.

In accordance with one or more embodiments of the invention, the transmitting electrodes and the receiving electrodes are transparent electrodes.

Another aspect of the invention is directed to a touch display apparatus, which includes a display panel with a display area and a touch panel stacked over the display panel. The touch panel includes a first electrode layer and a second electrode layer. The first electrode layer has transmitting electrodes arranged in transmitting channels and traces respectively coupled to the transmitting channels. The second electrode layer has receiving electrodes arranged in receiving channels. The transmitting electrodes, the one or more traces and the receiving electrodes are over the display area. At least one of the traces, the transmitting channels and one of the receiving channels in proximity of the traces form touch detection blocks that respectively correspond to the transmitting channels. For each touch detection block, in a circle area overlapped with at least one of the traces and substantially in the touch detection block corresponding to one of the transmitting channels, a summation of areas of the corresponded transmitting channel and the trace coupled to the corresponded transmitting channel is substantially larger than a summation of areas of the other transmitting channels and the other traces. A diameter of the circle area is substantially the same as a width of the touch detection block.

In accordance with one or more embodiments of the invention, the display panel is a liquid crystal display (LCD) display panel, an inorganic light emitting diode display panel or an organic light emitting diode (OLED) display panel.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

DETAILED DESCRIPTION

Figure 1:
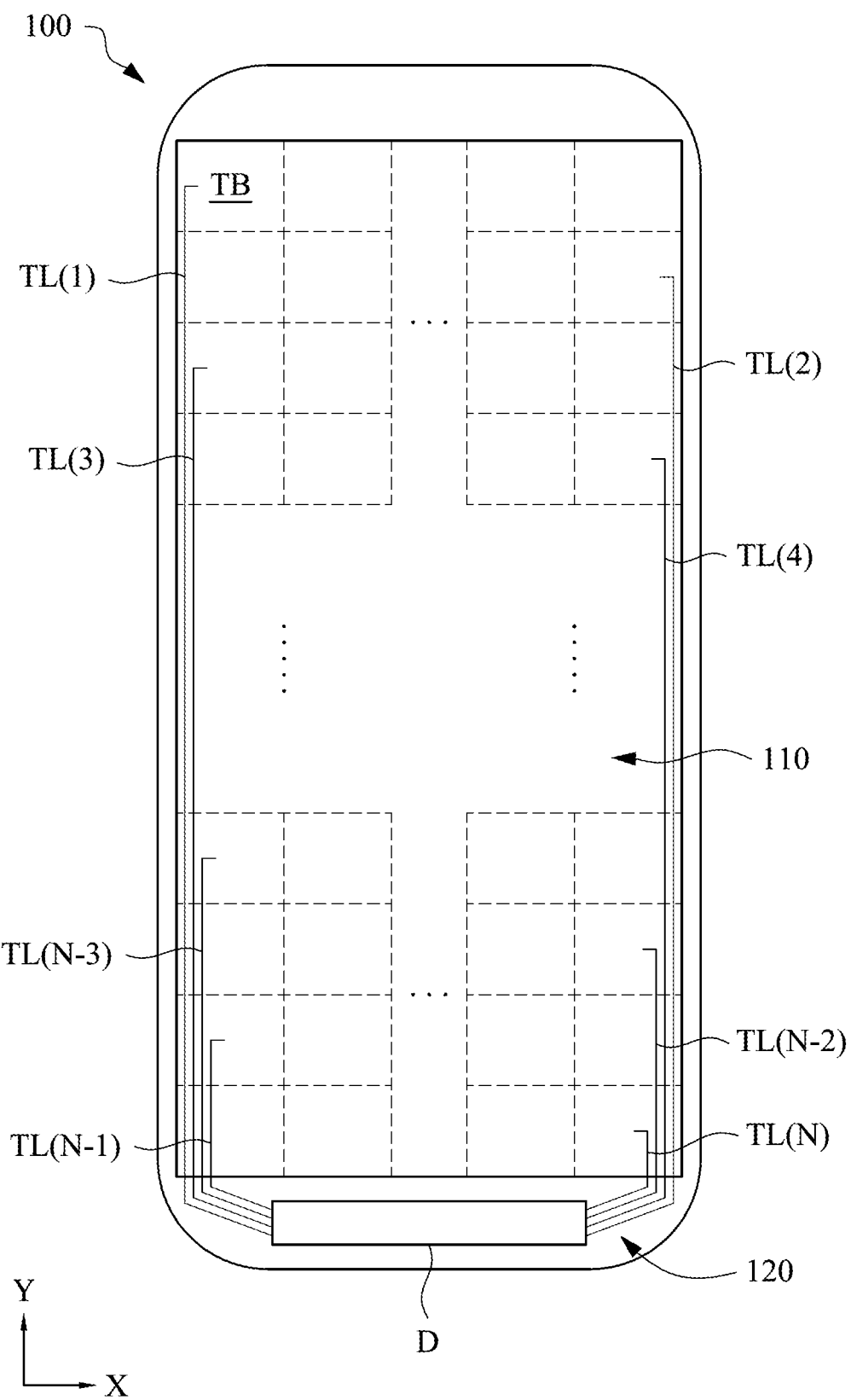
FIG. 1 is a schematic diagram of a touch panel in accordance with some embodiments of the invention.

The detailed explanation of the invention is described as following. The described preferred embodiments are presented for purposes of illustrations and description, and they are not intended to limit the scope of the invention.

In the following description and claims, the term "coupled" along with their derivatives, may be used. In particular embodiments, "coupled" may be used to indicate that two or more elements are in direct physical or electrical contact with each other, or may also mean that two or more elements may not be in direct contact with each other. "Coupled" may still be used to indicate that two or more elements cooperate or interact with each other.

Terms used herein are only used to describe the specific embodiments, which are not used to limit the claims appended herewith. Unless limited otherwise, the term "a," "an," "one" or "the" of the single form may also represent the plural form. Further, the spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The document may repeat reference numerals and/or letters in the various examples. This repetition is for the purpose of simplicity and clarity and does not in itself dictate a relationship between the various embodiments and/or configurations discussed.

It will be understood that, although the terms "first," "second" and so on may be used herein to describe various elements, components, areas, layers and/or portions, these elements, components, areas, layers and/or portions, should not be limited by these terms. These terms are only used to distinguish elements, components, areas, layers and/or portions.

FIG. 1 is a schematic diagram of a touch panel 100 in accordance with some embodiments of the invention. The touch panel 100 has a touch active area 110 and a peripheral area 120. In the touch active area 110, touch detection blocks TB are arranged as a matrix of N rows and M columns for detecting a touch operation. The touch detection blocks TB may have the same widths in X-axis and Y-axis directions shown in FIG. 1. That is, the rows of the touch detection blocks TB may have the same width in the Y-axis direction and the same lengths in the X-axis direction, the column of the touch detection blocks TB may have the same width in the X-axis direction and the same lengths in the Y-axis direction.

The touch detection blocks TB are electrically connected to a driving circuit D. The rows and columns of the touch detection blocks TB are respectively in transmitting channels and receiving channels for touch detection, and the driving circuit D transmits driving signals respectively to the rows of the touch detection blocks TB and receives detection signals respectively from the columns of the touch detection blocks TB. The driving circuit D may be disposed on the touch panel 100 and in the peripheral area 120, or otherwise be external to the touch panel 100. In the latter case, the driving circuit D may be integrated in a chip, and such chip may be mounted on, for example, a flexible printed circuit (FPC) film bonded to the touch panel 100.

The driving circuit D may provide the driving signals through traces TL(1)-TL(N) which are respectively coupled to the rows of the touch detection blocks TB. As shown in FIG. 1, the traces TL are physically separated as odd-numbered traces TL(1), TL(3), . . . , TL(N−1) respectively corresponding to odd-numbered rows of the touch detection blocks TB and even-numbered traces TL(2), TL(4), . . . , TL(N) respectively corresponding to even-numbered rows of the touch detection blocks TB. The odd-numbered traces TL(1), TL(3), . . . , TL(N−1) and the even-numbered traces TL(2), TL(4), . . . , TL(N) are arranged respectively at two opposite sides of the touch panel 100. In the touch panel 100, all traces TL extends into the touch active area 110. In particular, the odd-numbered traces TL(1), TL(3), . . . , TL(N−1) extend into the leftmost column of the touch detection blocks TB, and the even-numbered traces TL(2), TL(4), . . . , TL(N) extend into the rightmost column of the touch detection blocks TB. That is, each of the odd-numbered traces TL(1), TL(3), . . . , TL(N−1) has a portion that belong to the leftmost column of the touch detection blocks TB, and each of the even-numbered traces TL(2), TL(4), TL(N) has a portion that belong to the rightmost column of the touch detection blocks TB. In the following paragraphs, the touch detection block TB in the $i^{th}$ row and in the $j^{th}$ column are denoted as TB(i,j), and the numbers of the rows of the touch detection blocks TB is 16 (N=16) for illustrative purposes.

Figure 2:
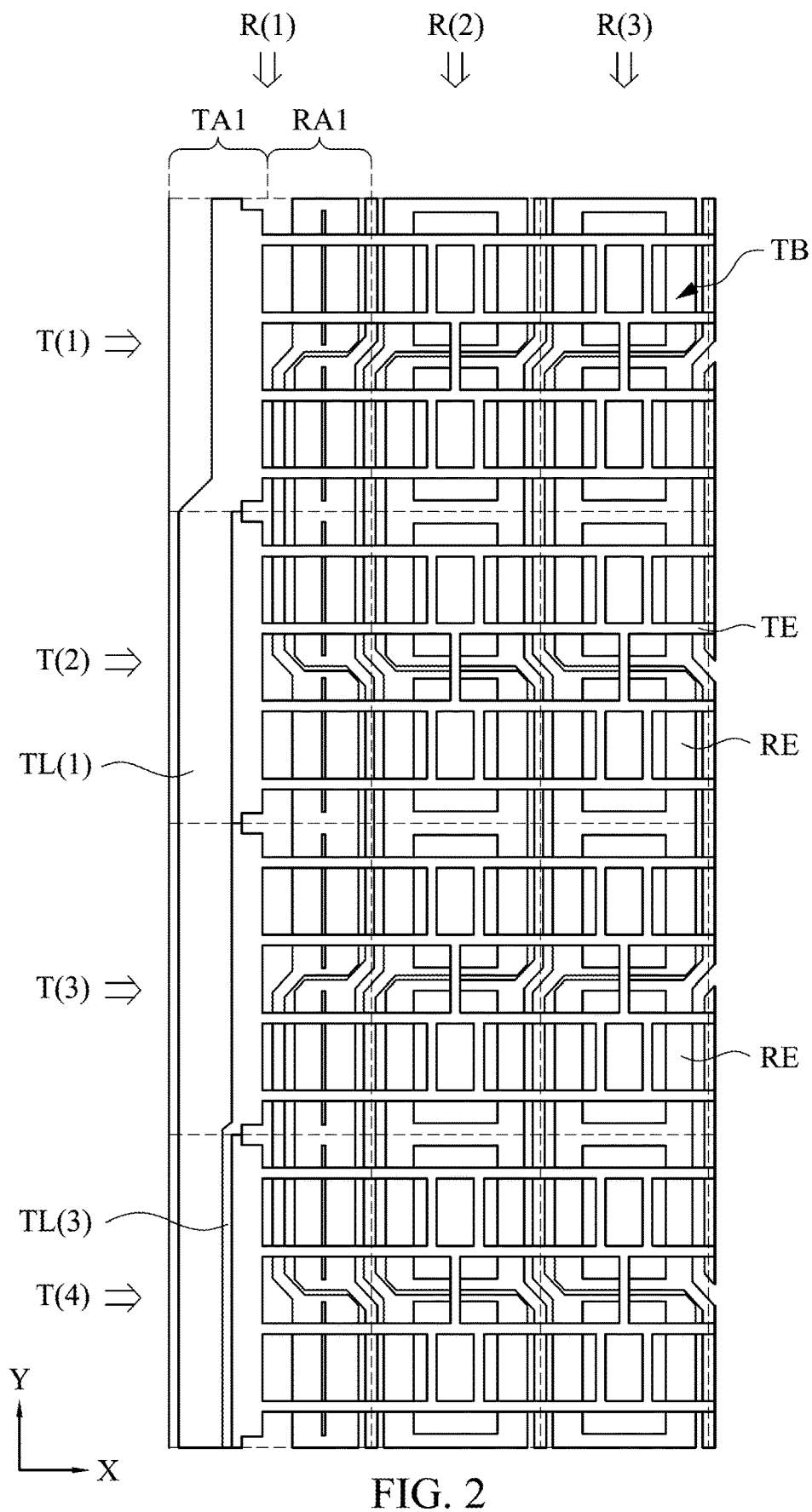
FIGS. 2-5 are enlarged views of respective portions of the touch panel in FIG. 1 in accordance with some exemplarily implementations.
Figure 3:
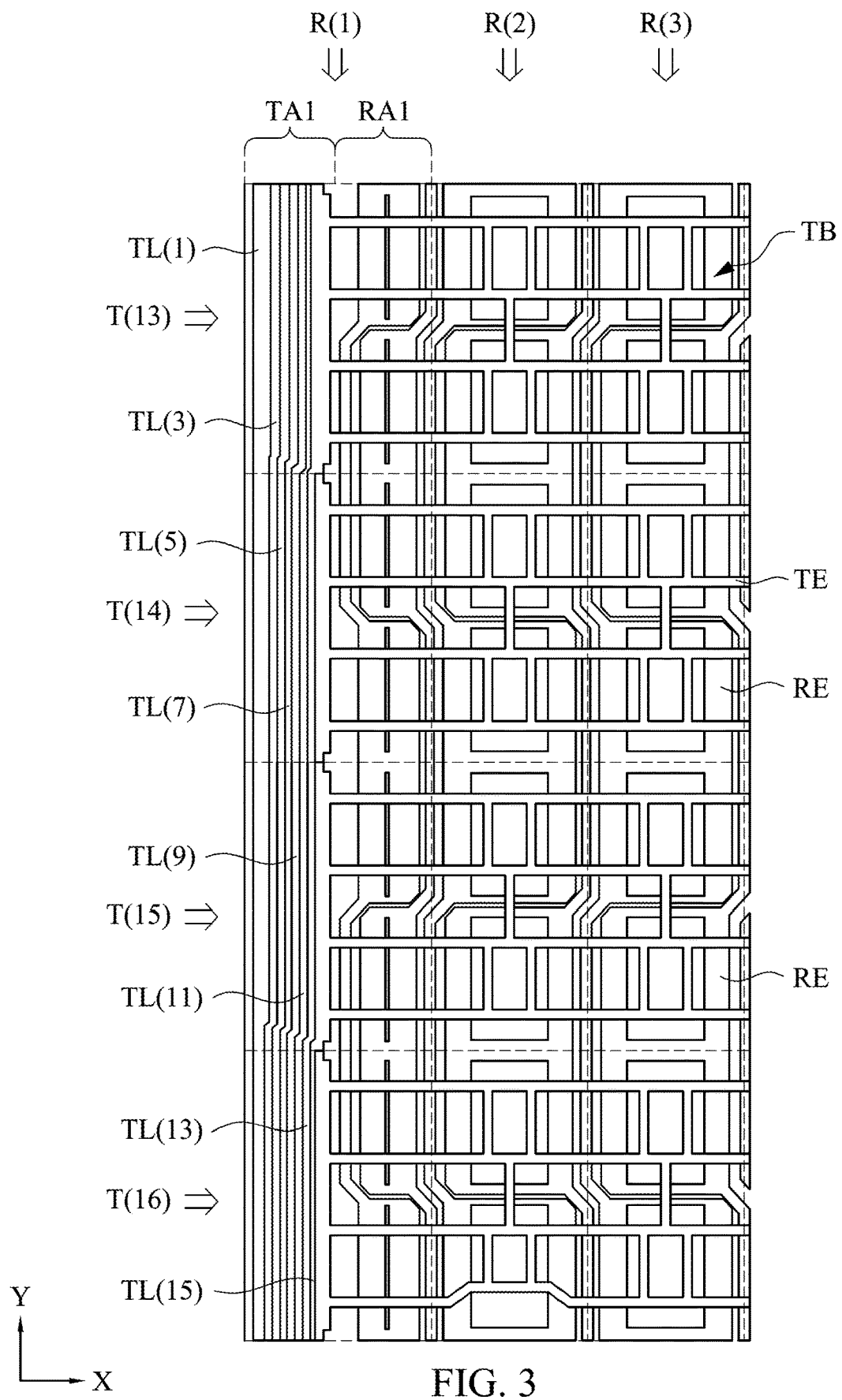
Figure 4:
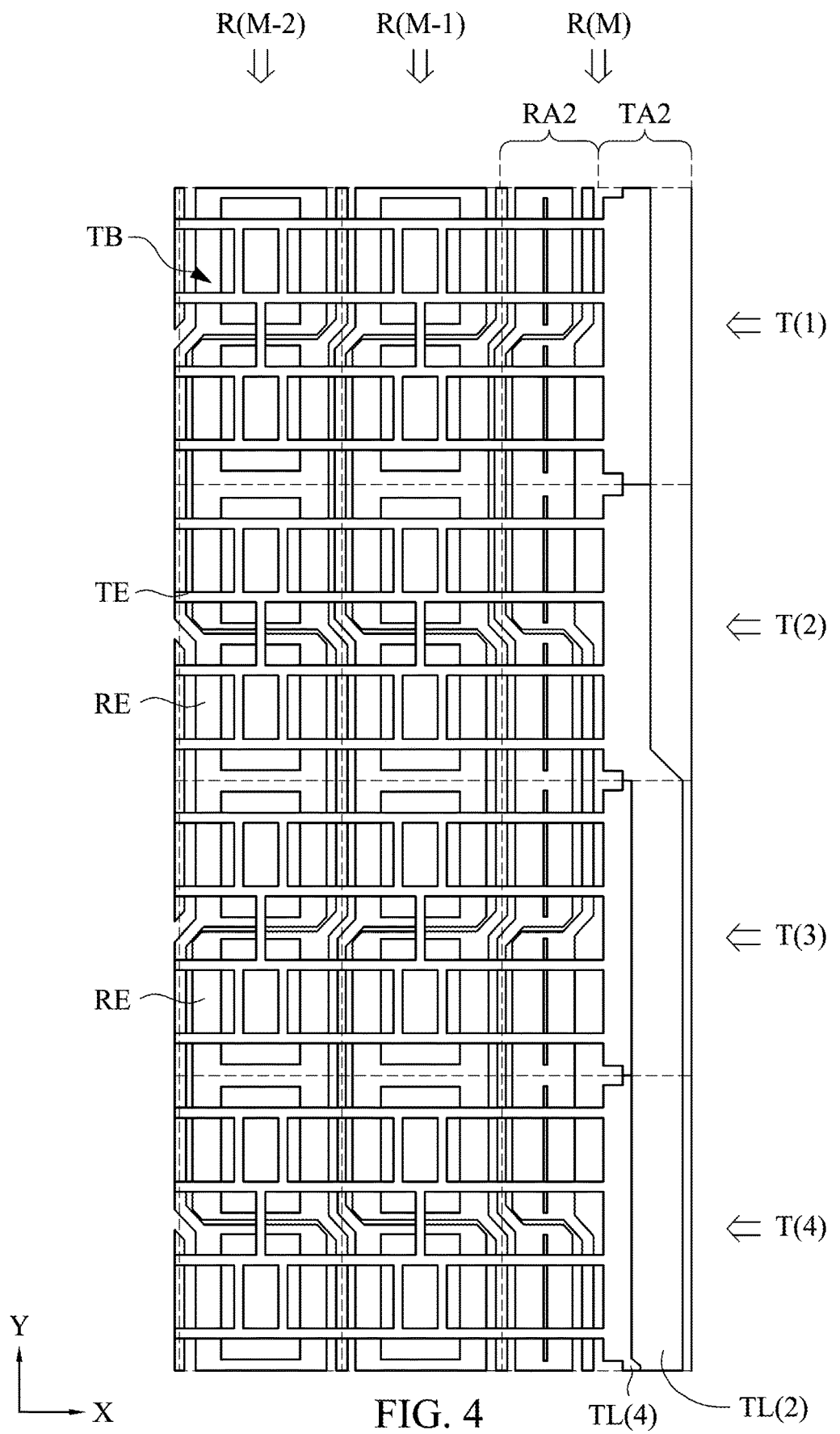
Figure 5:
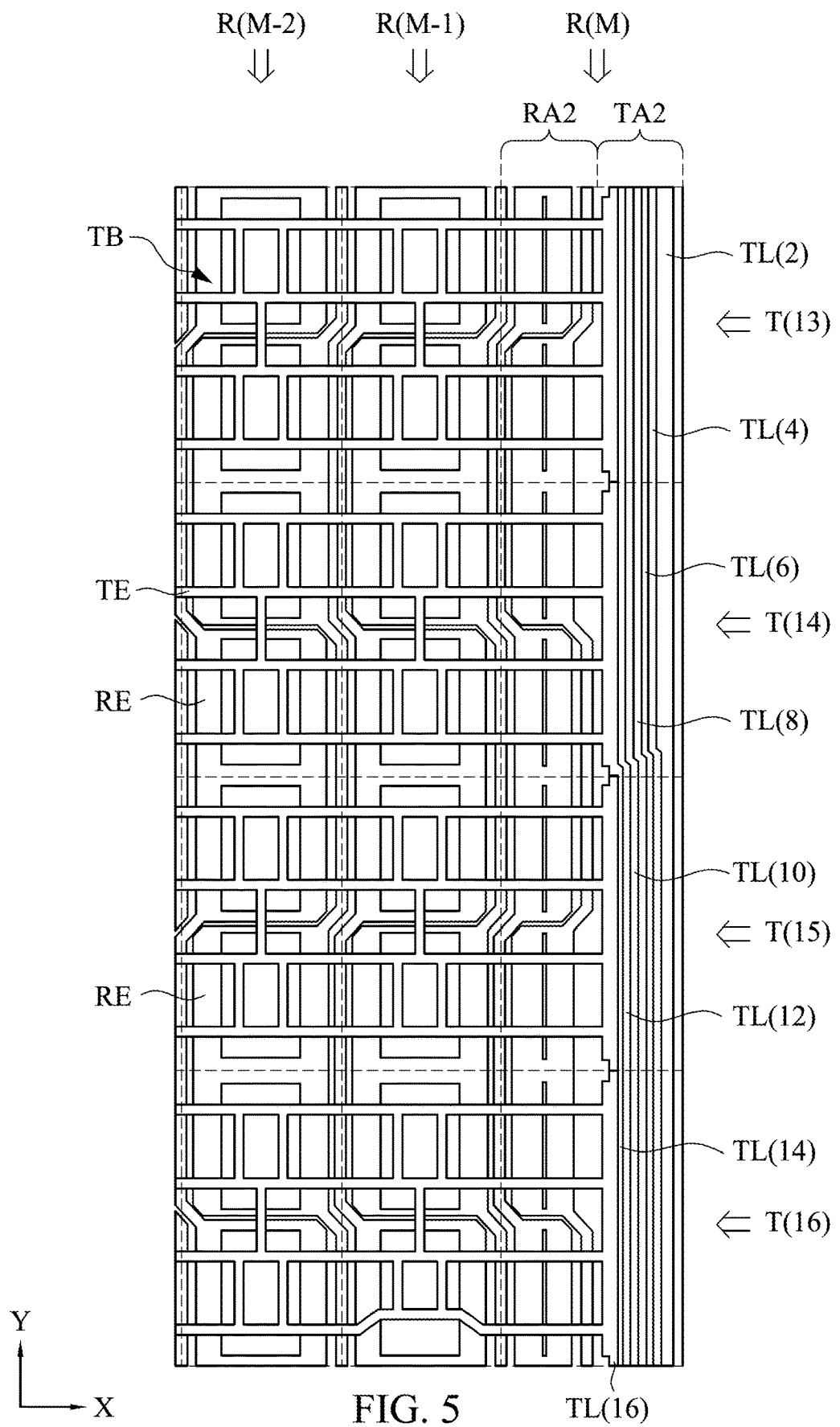

FIG. 2 to FIG. 5 are enlarged views of respective portions of the touch panel 100 for a first exemplarily example. In particular, FIG. 2 shows the $1^{st}$ to $3^{rd}$ columns (the $1^{st}$ column is the leftmost column) and the $1^{st}$ to $4^{th}$ rows of the touch detection blocks TB, FIG. 3 shows the $1^{st}$ to $3^{rd}$ columns and the $13^{th}$ to $16^{th}$ rows of the touch detection blocks TB, FIG. 4 shows the $(M-2)^{th}$ to $M^{th}$ columns and the $1^{st}$ to $4^{th}$ rows of the touch detection blocks TB, and FIG. 5 shows the $(M-2)^{th}$ to $M^{th}$ columns and the $13^{th}$ to $16^{th}$ rows of the touch detection blocks TB. Transmitting electrodes TE in the $1^{st}$ to $16^{th}$ rows of the touch detection blocks TB respectively form transmitting channels T(1)-T(16), and receiving electrodes RE in the $1^{st}$ to $M^{th}$ columns of the touch detection blocks TB respectively form receiving channels R(1)-R(M). In each touch detection block TB, the transmitting electrode is overlapped with the receiving electrode. Moreover, each of the traces TL(1)-TL(16) is connected with a corresponding one of the transmitting electrodes TE. For illustration, the trace TL(1) is connected with the transmitting electrode TE in the $1^{st}$ transmitting channel T(1).

It is noted that although only some of the touch detection blocks TB of the touch panel 100 are shown in FIGS. 2-5 for illustrative purposes, it can be known from the context that each of the other touch detection blocks TB also has a similar arrangement to that shown in FIGS. 2-5.

The mutual capacitances between the transmitting electrodes TE and the receiving electrodes RE change when an object (e.g. a finger or a stylus) touches the touch panel 100. With the driving circuit D detecting changes of the mutual capacitances between the transmitting electrodes TE of the transmitting channels T(1)-T(16) and the receiving electrodes RE of the receiving channels R(1)-R(M), the touch area of the touch panel 100 can be determined.

The transmitting electrodes TE of the transmitting channels T(1)-T(16) and the traces TL(1)-TL(N) belong to a first electrode layer, the receiving electrodes RE of the receiving channels R(1)-R(M) belong to a second electrode layer, and the first electrode layer is over the second electrode layer. In alternative embodiments, the first electrode layer is vertically below the second electrode layer. The first electrode layer and the second electrode layer may be formed from metal, such as silver, gold, etc., and/or transparent conductive material, such as indium tin oxide (ITO), indium zinc oxide (IZO), indium zinc tin oxide (IZTO), zinc oxide (ZnO), antimony tin oxide (ATO), fluorine tin oxide (FTO), cadmium tin oxide (CTO), or the like. In some examples, for integrating the touch panel 100 and a display panel for touch display applications, the transmitting electrodes TE, the receiving electrodes RE and the traces TL(1)-TL(N) of the touch panel 100 may be formed from transparent conductive material.

The leftmost column of the touch detection blocks TB, i.e. in the $1^{st}$ receiving channel R(1), has a trace area TA1 and a receiving electrode area RA1; the odd-numbered traces TL(1), TL(3), . . . , TL(N−1) are arranged in the trace area TA1, while the receiving electrodes RE of the $1^{st}$ receiving channel R(1) in proximity of the odd-numbered traces TL(1), TL(3), . . . , TL(N−1) are arranged in the receiving electrode area RA1. Similarly, the rightmost column of the touch detection blocks TB, i.e. in the $M^{th}$ receiving channel R(M), has a trace area TA2 and a receiving electrode area RA2; the even-numbered traces TL(2), TL(4), . . . , TL(N) are arranged in the trace area TA2, while the receiving electrodes of the $M^{th}$ receiving channel R(M) in proximity of the even-numbered traces TL(2), TL(4), . . . , TL(N) are arranged in the receiving electrode area RA2. The widths of the trace areas TA1, TA2 and the receiving electrode areas RA1 and RA2 can be determined depending on various design requirements of the touch panel 100.

Figure 6:
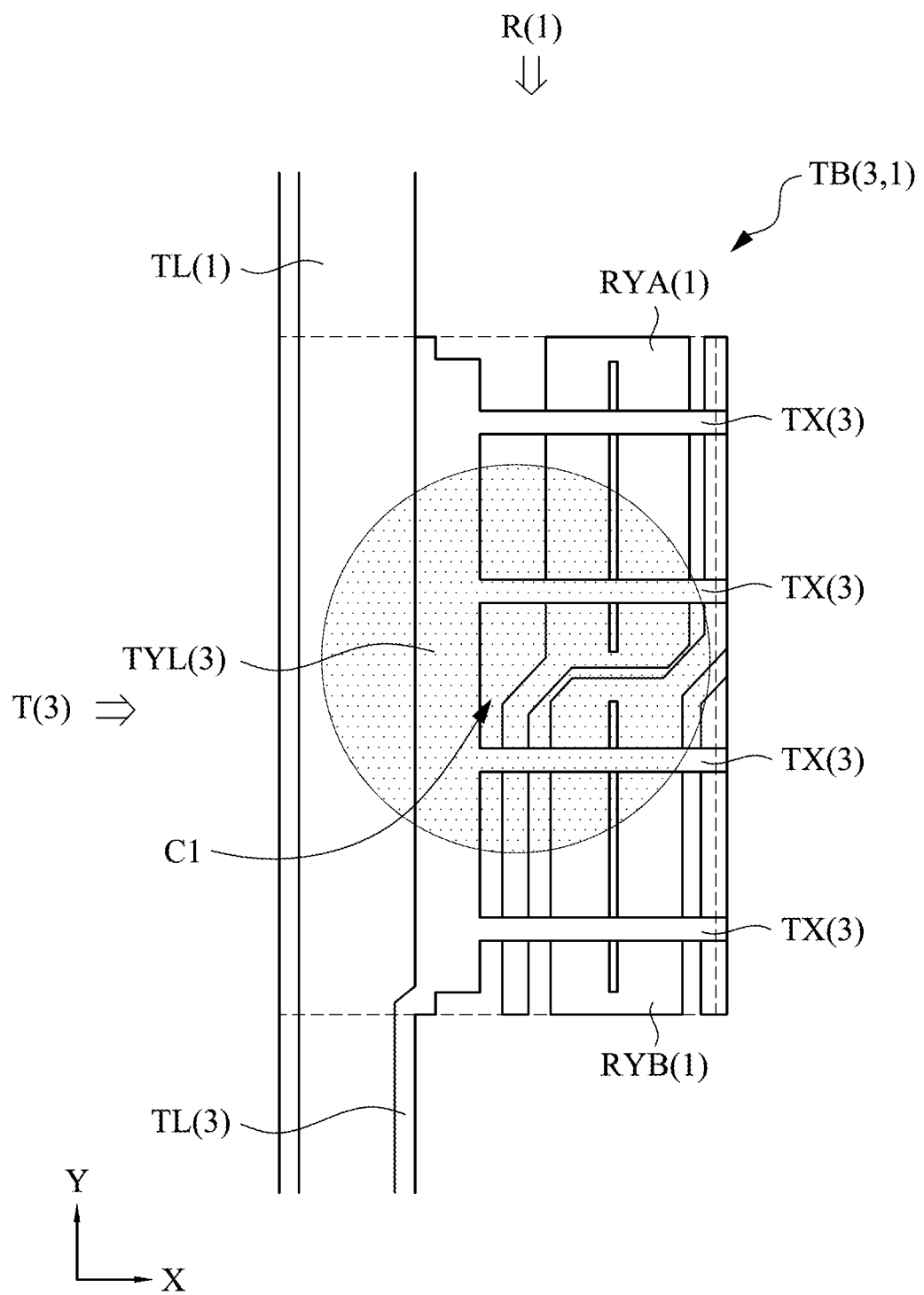
FIGS. 6-9 are enlarged views of various touch detection blocks and one or more traces of the touch panel respectively shown in FIGS. 2 and 3.

Several enlarged touch detection blocks of the touch panel 100 are illustrated in FIG. 6 to FIG. 13 for exemplary description. FIG. 6 exemplarily illustrates the touch detection block TB(3,1) of the touch panel 100. As shown in FIG. 6, the odd-numbered traces TL(1), TL(3) are arranged at the left of the touch detection block TB(3,1), i.e. in the trace area TA1, and the receiving electrodes RE are arranged at the right of the touch detection block TB(3,1), i.e. in the receiving electrode area RA1. The transmitting electrode TE in the $3^{rd}$ transmitting channel T(3) includes main branches TX(3) extending in the X-axis direction and a peripheral branch TYL(3) extending in the Y-axis direction, and the receiving electrodes RE in the $1^{st}$ receiving channel R(1) are respectively denoted as receiving electrodes RYA(1), RYB(1) respectively in the upper and lower halves of the touch detection block TB(3,1). The peripheral branch TYL(3) physically connects the main branches TX(3) and the trace TL(3), such that the driving circuit D transmits a driving signal to the peripheral branch TYL(3) and the main branches TX(3) through the trace TL(3). Particularly, the peripheral branch TYL(3) is arranged in the space between the odd-numbered traces TL(1), TL(3) and the receiving electrodes RYA(1), RYB(1) for increasing the area of the transmitting electrode TE in the touch detection block TB(3,1).

Figure 7:
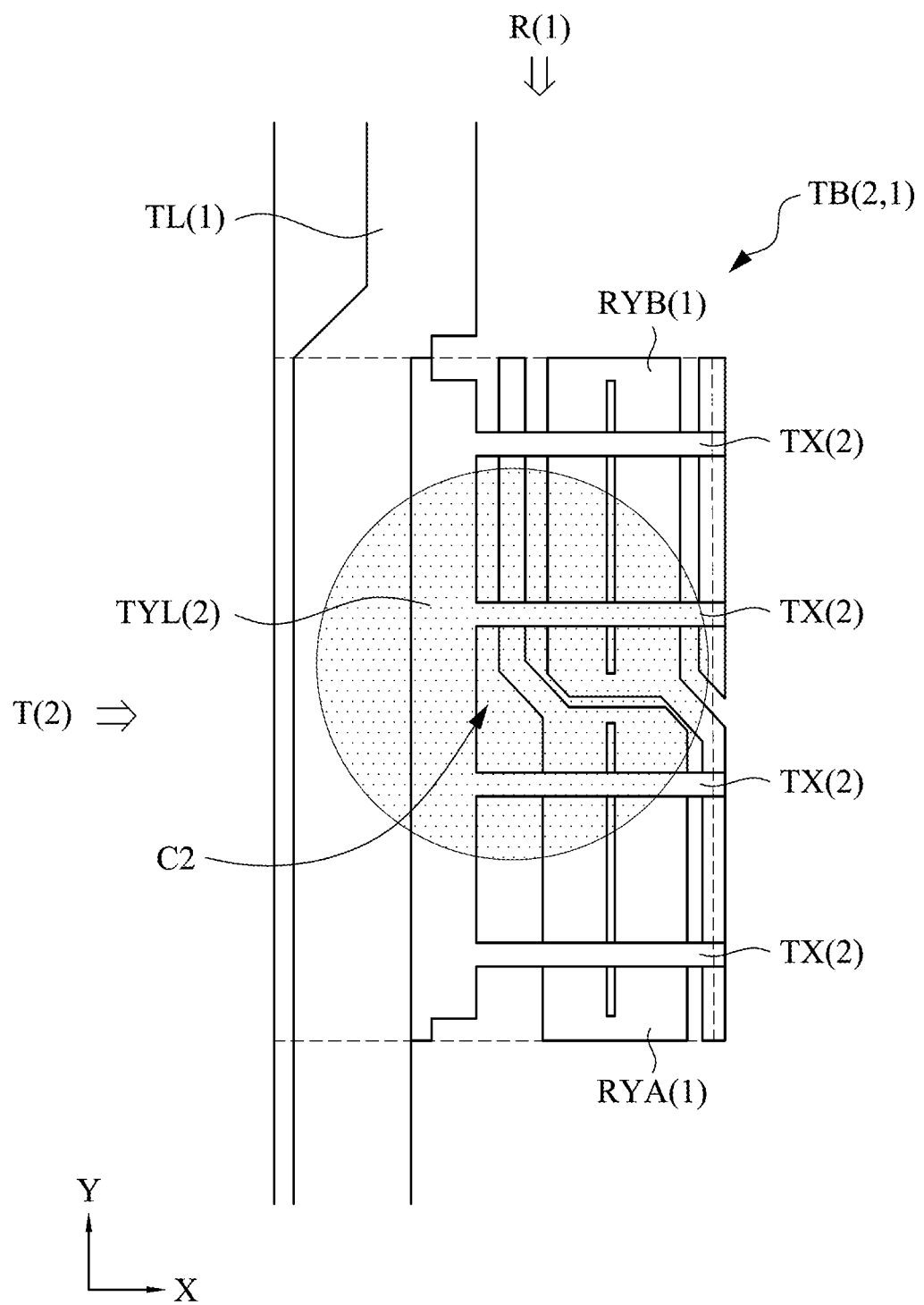

FIG. 7 exemplarily illustrates the touch detection block TB(2,1) of the touch panel 100. As shown in FIG. 7, the odd-numbered trace TL(1) is arranged at the left of the touch detection block TB(2,1), i.e. in the trace area TA1, and the receiving electrodes RYA(1), RYB(1) are arranged at the right of the touch detection block TB(2,1), i.e. in the receiving electrode area RA1. The transmitting electrode TE in the $2^{nd}$ transmitting channel T(2) includes main branches TX(2) extending in the X-axis direction and a peripheral branch TYL(2) extending in the Y-axis direction. In comparison with the touch detection block TB(3,1), the receiving electrodes RYA(1), RYB(1) are respectively in the lower and upper halves of the touch detection block TB(2,1), and the peripheral branch TYL(2) connects the main branches TX(2) but is physically spaced from the odd-numbered trace TL(1) and the transmitting electrodes TE respectively in the transmitting channels T(1) and T(3). The peripheral branch TYL(2) is arranged in the space between the odd-numbered trace TL(1) and the receiving electrodes RYA(1), RYB(1) for increasing the area of the transmitting electrode TE in the touch detection block TB(2,1). The main branches TX(2) and the peripheral branch TYL(2) receive a driving signal from the driving circuit D through the trace TL(2) arranged in the touch detection block TB(2,M) (not shown in FIG. 7).

Figure 8:
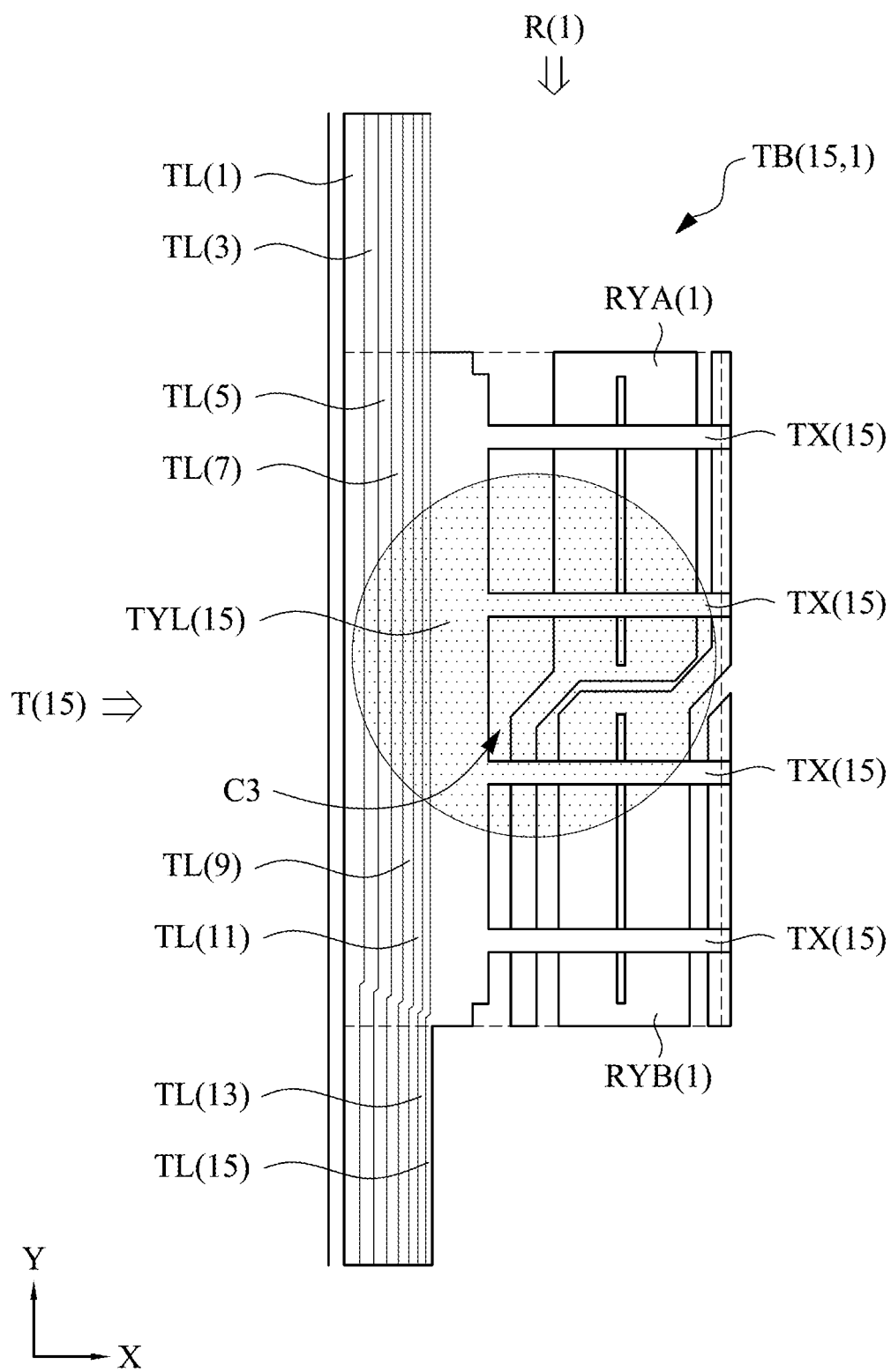

FIG. 8 exemplarily illustrates the touch detection block TB(15,1) of the touch panel 100. As shown in FIG. 8, the odd-numbered traces TL(1), TL(3), . . . , TL(15) are arranged at the left of the touch detection block TB(15,1), i.e. in the trace area TA1, and the receiving electrodes RYA(1), RYB(1) are arranged at the right of the touch detection block TB(15,1), i.e. in the receiving electrode area RA1. The transmitting electrode TE in the $15^{th}$ transmitting channel T(15) includes main branches TX(15) extending in the X-axis direction and a peripheral branch TYL(15) extending in the Y-axis direction, and the receiving electrodes RYA(1), RYB(1) are respectively in the upper and lower halves of the touch detection block TB(15,1). Similar to the peripheral branch TYL(3) in the touch detection block TB(3,1), the peripheral branch TYL(15) is arranged in the space between the odd-numbered traces TL(1), TL(3), . . . , TL(15) and the receiving electrodes RYA(1), RYB(1) for increasing the area of the transmitting electrode TE in the touch detection block TB(15,1). The peripheral branch TYL(15) physically connects the main branches TX(15) and the trace TL(15), such that the driving circuit D transmits a driving signal to the peripheral branch TYL(15) and the main branches TX(15) through the trace TL(15).

Figure 9:
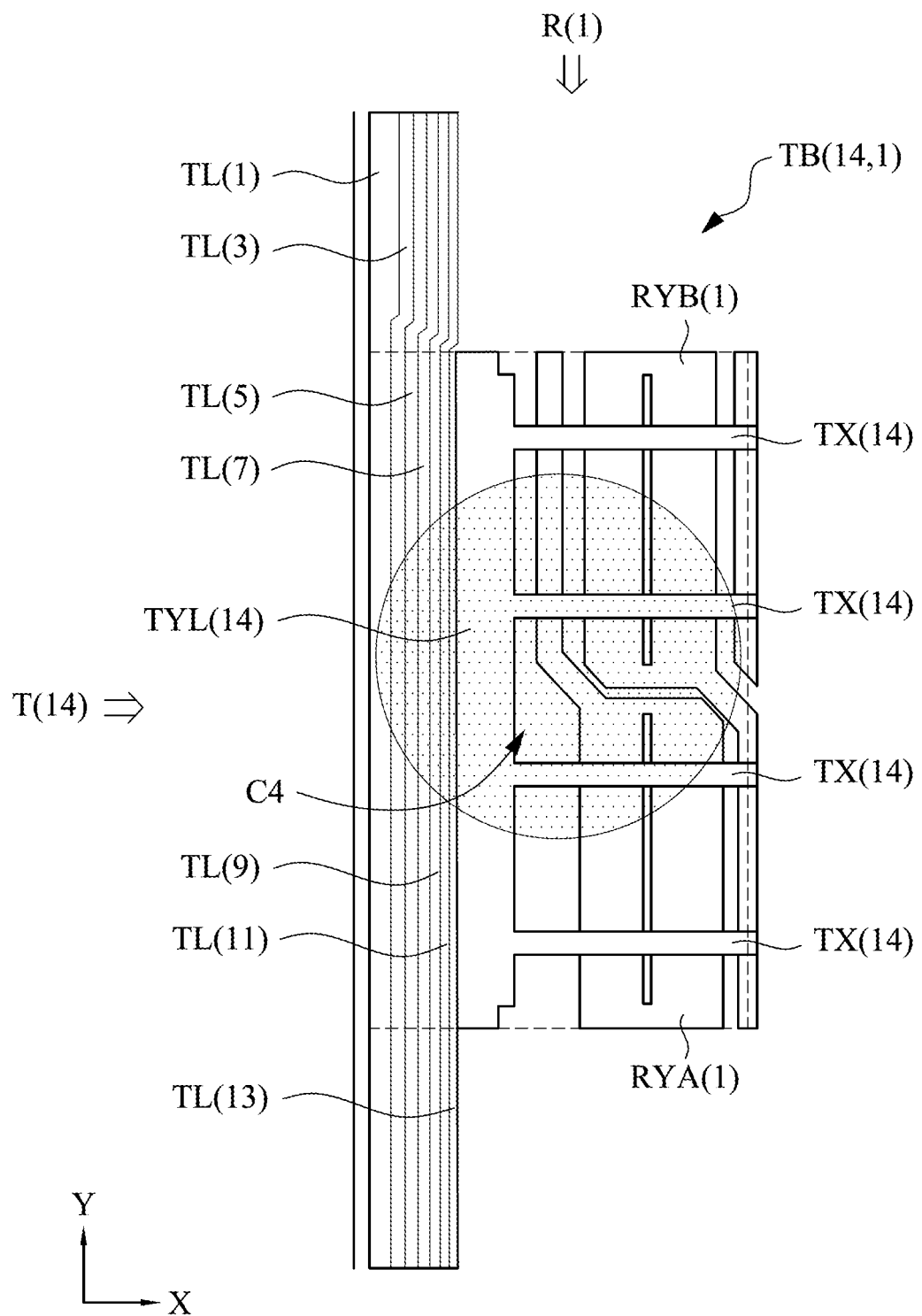

FIG. 9 exemplarily illustrates the touch detection block TB(14,1) of the touch panel 100 shown in FIG. 3. As shown in FIG. 9, the odd-numbered traces TL(1), TL(3) TL(13) are arranged at the left of the touch detection block TB(14,1), i.e. in the trace area TA1, and the receiving electrodes RYA(1), RYB(1) are at the right of the touch detection block TB(14,1), i.e. in the receiving electrode area RA1. The transmitting electrode TE in the $14^{th}$ transmitting channel T(14) includes main branches TX(14) extending in the X-axis direction and a peripheral branch TYL(14) extending in the Y-axis direction. Similar to the touch detection block TB(2,1), the receiving electrodes RYA(1), RYB(1) are respectively in the lower and upper halves of the touch detection block TB(14,1), and the peripheral branch TYL(14) connects the main branches TX(14) but is physically spaced from the odd-numbered traces TL(1), TL(3), TL(13) and the transmitting electrodes TE respectively in the transmitting channels T(13), T(15). The main branches TX(14) and the peripheral branch TYL(14) receive a driving signal from the driving circuit D through the trace TL(14) arranged in the touch detection block TB(14,M) (not shown in FIG. 9).

For edge touch detection, when an object, such as a copper cylinder, a human finger, or another suitable object, touches the touch panel 100 over one of the edge touch detection blocks (including the touch detection blocks TB(1,1)-TB(16,1) and TB(1,M)-TB(16,M)), the mutual capacitance characteristic value of the touched edge touch detection block is significantly greater than that of any other touch detection block, and the self capacitance characteristic value of the corresponding transmitting channel is significantly greater than that of any other transmitting channel. For ensuring edge touch detection accuracy of the touch panel 100, a circle area within one of the touch detection blocks TB(1,1)-TB(16,1) and TB(1,M)-TB(16,M) and of which the diameter is approximately the same as the width of the underlying touch detection block meets the following condition: within the circle area, a summation of areas of the corresponded transmitting channel and the trace coupled to the corresponded transmitting channel is substantially larger than a summation of areas of the other transmitting channels and the other traces.

For example, FIG. 6 also shows a circle area C1 equivalent to the area of the touch panel 100 touched by an object within the touch detection block TB(3,1) and of which the diameter is approximately the same as the width of the touch detection block TB(3,1). For the touch detection block TB(3,1), a summation of the areas of the transmitting channel TX(3) and the trace TL(3) in the circle area C1 is substantially larger than a summation of the areas of the transmitting channels TX(1)-TX(2), TX(4)-TX(16) and the traces TL(1)-TL(2), TL(4)-TL(16) in the circle area C1. Since the circle area C1 is overlapped with the traces TL(1), TL(3) and the transmitting channel T(3), the condition can be simplified as: a summation of the areas of the transmitting channel T(3) and the trace TL(3) is substantially larger than the area of the trace TL(1). As such, when an touch operation on the touch detection block TB(3,1) is performed by the object, the mutual capacitance characteristic value of the touch detection block TB(3,1) becomes significantly greater than that of any other touch detection block (including the touch detection block TB(1,1)). If the width of the touch detection block TB(3,1) is 2.5-5 millimeters (mm), then the diameter of the circle area C1 may also be approximately 2.5-5 mm.

In addition, FIG. 7 to FIG. 9 also show circle areas C2-C4 respectively within the touch detection blocks TB(2,1), TB(15,1), TB(14,1). In FIG. 7/8/9, the circle area C2/C3/C4 equivalents the area of the touch panel touched by an object within the touch detection block TB(2,1)/TB(15,1)/TB(14,1). The area of each of the circle areas C2-C4 may be the same as that of the circle area C1, and similarly, within the circle area C2, the area of the transmitting channel T(2) is greater than the area of the trace TL(1); within the circle area C3, the summation of the areas of the transmitting channel T(15) and the trace TL(15) is greater than the summation of the areas of the traces TL(1), TL(3) . . . , TL(13); within the circle area C4, the area of the transmitting channel T(14) is greater than the summation of the areas of the traces TL(1), TL(3) . . . , TL(13).

Figure 10:
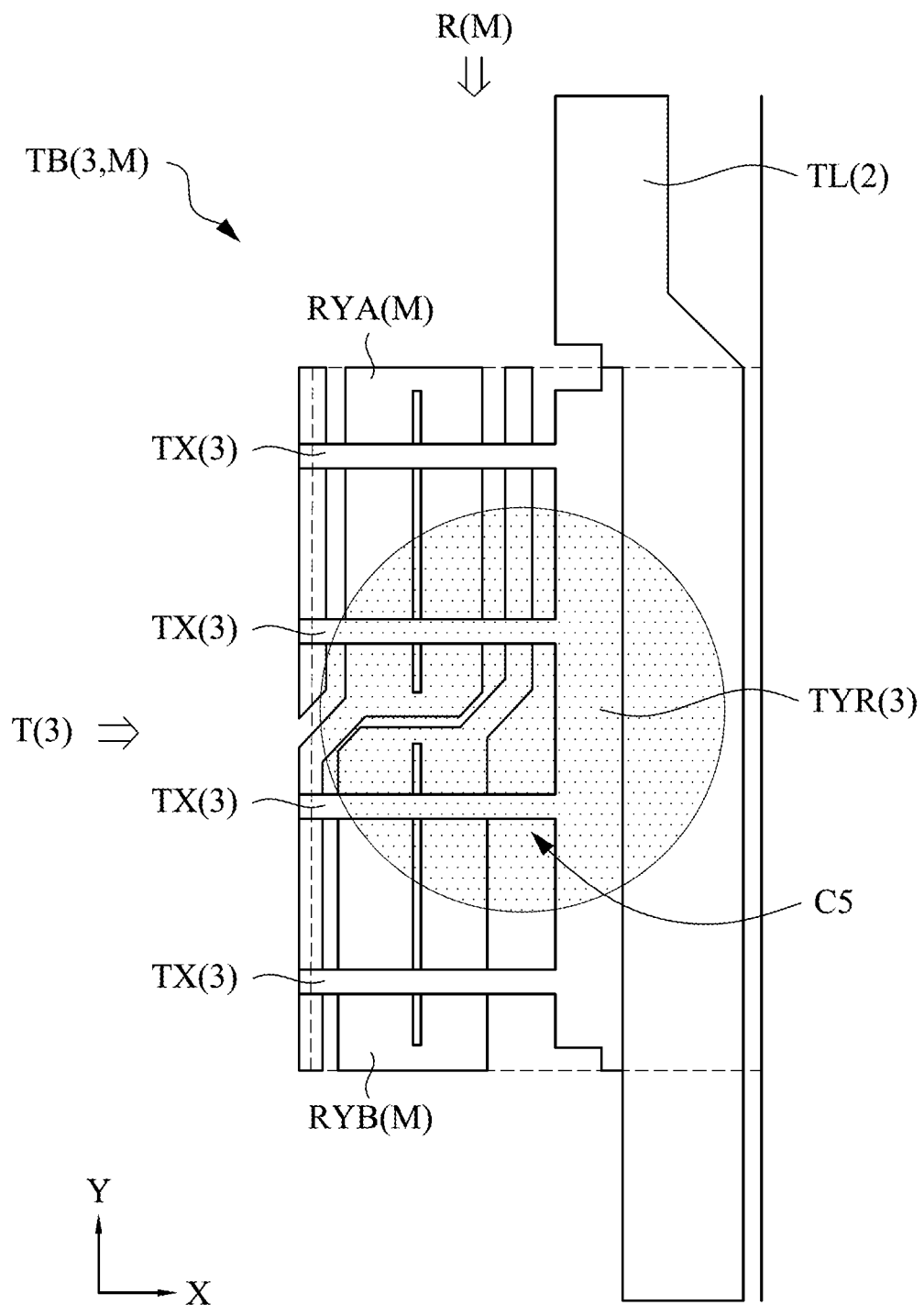
FIGS. 10-13 are enlarged views of various touch detection blocks and one or more traces of the touch panel respectively shown in FIGS. 4 and 5.

FIG. 10 exemplarily illustrates the touch detection block TB(3,M) of the touch panel 100 shown in FIG. 4. As shown in FIG. 10, the even-numbered trace TL(2) is arranged at the right of the touch detection block TB(3,M), i.e. in the trace area TA2, and the receiving electrodes RE are arranged at the left of the touch detection block TB(3,M), i.e. in the receiving electrode area RA2. The transmitting electrode TE in the $3^{rd}$ transmitting channel T(3) further includes a peripheral branch TYR(3) extending in the Y-axis direction, and the receiving electrodes RE in the $M^{th}$ receiving channel R(M) are respectively denoted as receiving electrodes RYA(M), RYB(M) respectively in the upper and lower halves of the touch detection block TB(3,M). Opposite to the peripheral branch TYL(3) in the touch detection block TB(3,1), the peripheral branch TYR(3) connects the main branches TX(3) but is physically spaced from the even-numbered trace TL(2) and the transmitting electrodes TE respectively in the transmitting channels T(2) and T(4). The peripheral branch TYR(3) is arranged in the space between the even-numbered trace TL(2) and the receiving electrodes RYA(M), RYB(M) for increasing the area of the transmitting electrode TE in the touch detection block TB(3,M).

Figure 11:
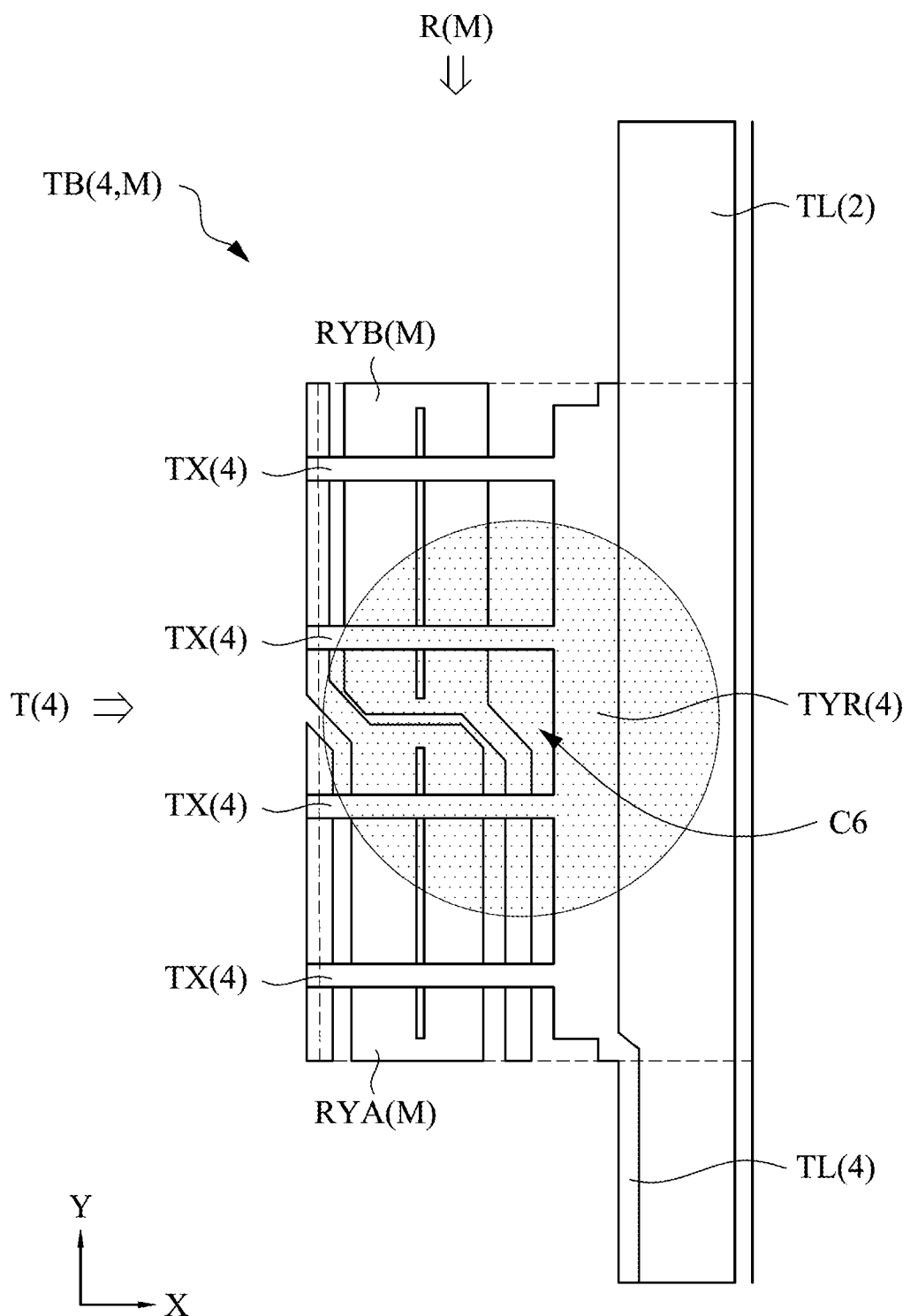

FIG. 11 exemplarily illustrates the touch detection block TB(4,M) of the touch panel 100 shown in FIG. 4. As shown in FIG. 11, the odd-numbered trace TL(1) is arranged at the right of the touch detection block TB(4,M), i.e. in the trace area TA2, and the receiving electrodes RYA(M), RYB(M) are arranged at the left of the touch detection block TB(4,M), i.e. in the receiving electrode area RA2. The transmitting electrode TE in the $4^{th}$ transmitting channel T(4) includes main branches TX(4) extending in the X-axis direction and a peripheral branch TYR(4) extending in the Y-axis direction. In comparison with the touch detection block TB(3,M), the receiving electrodes RYA(M), RYB(M) are respectively in the lower and upper halves of the touch detection block TB(4,M), and the peripheral branch TYR(4) physically connects the main branches TX(4) and the trace TL(4), such that the driving circuit D transmits a driving signal to the peripheral branch TYR(4) and the main branches TX(4) through the trace TL(4).

Figure 12:
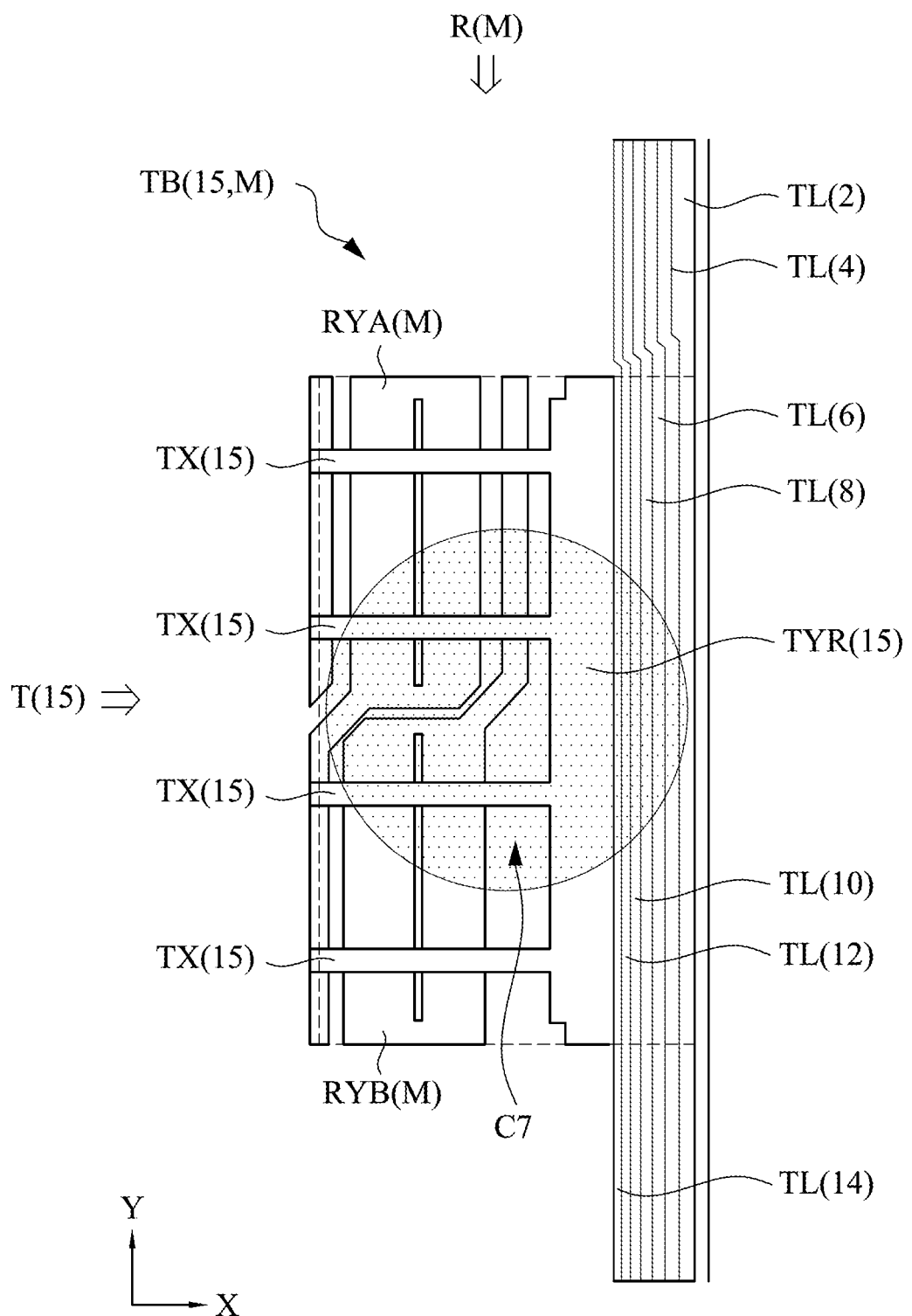

FIG. 12 exemplarily illustrates the touch detection block TB(15,M) of the touch panel 100 shown in FIG. 5. As shown in FIG. 12, the traces TL(2), T(4), . . . , TL(14) are arranged at the right of the touch detection block TB(15,M), i.e. in the trace area TA2, and the receiving electrodes RYA(M), RYB(M) are arranged at the left of the touch detection block TB(15,M), i.e. in the receiving electrode area RA2. The transmitting electrode TE in the $15^{th}$ transmitting channel T(15) further includes a peripheral branch TYR(15) extending in the Y-axis direction, and the receiving electrodes RYA(M), RYB(M) are respectively in the upper and lower halves of the touch detection block TB(15,1). Similar to the peripheral branch TYL(3) in the touch detection block TB(3,M), the peripheral branch TYR(15) connects the main branches TX(15) but is physically spaced from the even-numbered traces TL(2), TL(4), TL(14) and the transmitting electrodes respectively in the transmitting channels T(14) and T(16). The peripheral branch TYR(15) is arranged in the space between the even-numbered traces TL(2), TL(4), TL(14) and the receiving electrodes RYA(M), RYB(M) for increasing the area of the transmitting electrode TE in the touch detection block TB(15,M).

Figure 13:
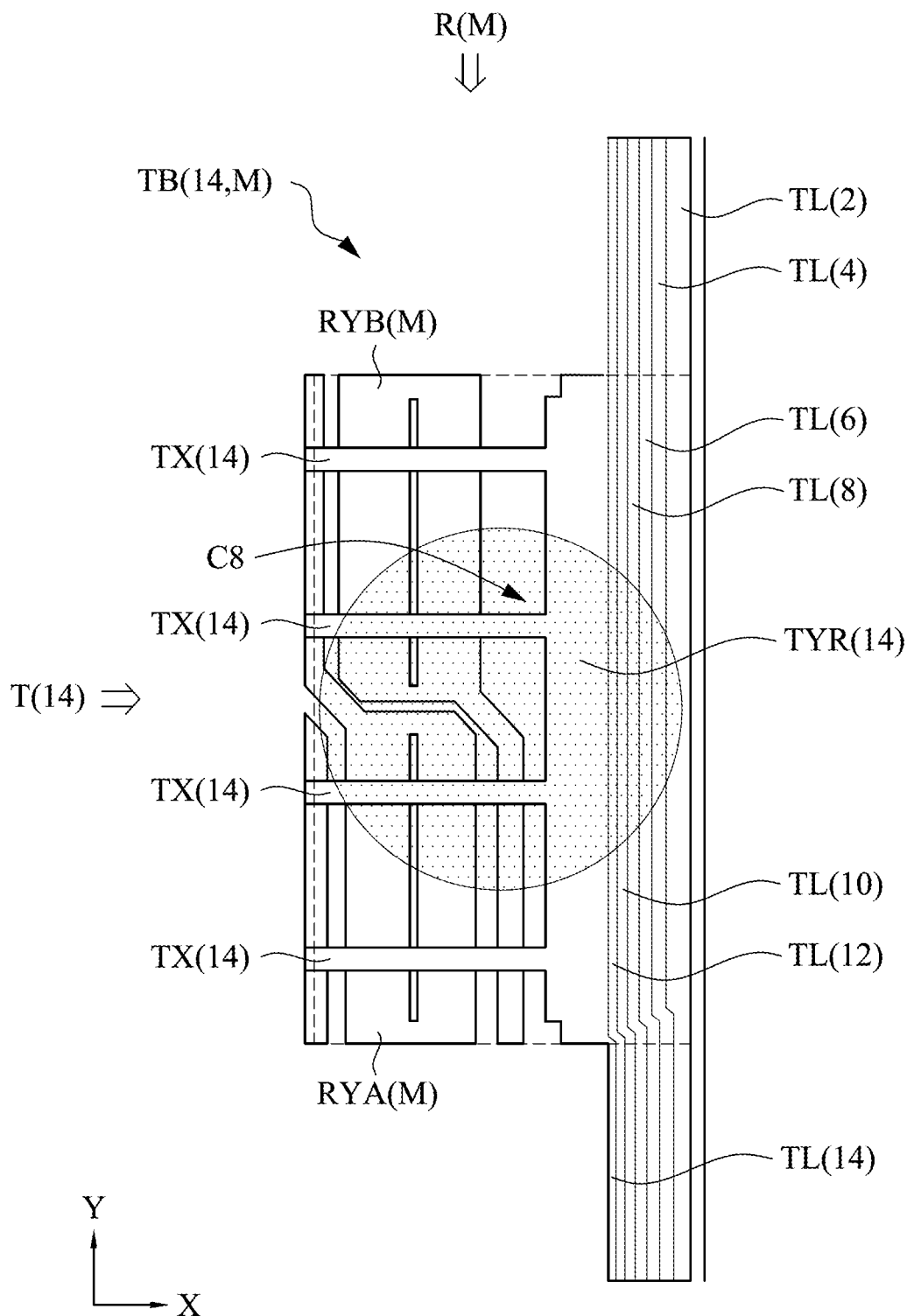

FIG. 13 exemplarily illustrates the touch detection block TB(14,M) of the touch panel 100 shown in FIG. 5. As shown in FIG. 13, the even-numbered traces TL(2), TL(4), . . . , TL(14) are arranged at the right of the touch detection block TB(14,M), i.e. in the trace area TA2, and the receiving electrodes RYA(M), RYB(M) are at the left of the touch detection block TB(14,M), i.e. in the receiving electrode area RA2. The transmitting electrode TE in the $14^{th}$ transmitting channel T(14) further includes a peripheral branch TYR(14) extending in the Y-axis direction. Similar to the touch detection block TB(4,M), the receiving electrodes RYA(M), RYB(M) are respectively in the lower and upper halves of the touch detection block TB(14,M), and the peripheral branch TYL(14) physically connects the main branches TX(14) and the trace TL(14), such that the driving circuit D transmits a driving signal to the peripheral branch TYR(14) and the main branches TX(14) through the trace TL(14).

In some embodiments, the widths of the odd-numbered traces TL(1), TL(3), TL(15) in the same touch detection block TB are non-increasing, and/or the widths of the even-numbered traces TL(2), TL(4), TL(16) in the same touch detection block TB are non-increasing. That is, the width of the trace TL(1) is greater than or equal to the width of the trace TL(3), the width of the trace TL(2) is greater than or equal to the width of the trace TL(4), the trace TL(3) is greater than or equal to the width of the trace TL(5), the width of the trace TL(4) is greater than or equal to the width of the trace TL(6), and so on.

Each of the traces TL(1)-TL(16) respectively in different touch detection blocks TB may have the same width or different widths. For example, as shown in FIG. 3, the width of the trace TL(1) gradually increases in the Y-axis direction. In addition, in certain embodiments, the peripheral branches TYL(1)-TYL(16) and TYR(1)-TYR(16) of the transmitting electrodes TE respectively in the transmitting channels T(1)-T(16) may have the same width or different widths, and/or the main branches TX(1)-TX(16) of the transmitting electrodes TE respectively in the transmitting channels T(1)-T(16) may have the same width or different widths.

Moreover, for the rightmost column of the touch detection blocks TB, FIG. 10 to FIG. 13 also show circle areas C5-C8 respectively within the touch detection blocks TB(3,M), TB(4,M), TB(15,M), TB(14,M). In FIGS. 10/11/12/13, the circle area C5/C6/C7/C8 equivalents the area of the touch panel 100 touched by an object within the touch detection block TB(3,M)/TB(4,M)/TB(15,M)/TB(14,M). The area of each of the circle areas C5-C8 may be the same as that of the circle area C1, and similarly, within the circle area C5, the area of the transmitting channel T(3) is greater than the area of the trace TL(2); within the circle area C6, the summation of the areas of the transmitting channel T(4) and the trace TL(4) is greater than the area of the trace TL(2); within the circle area C7, the area of the transmitting channel T(15) is greater than the summation of the areas of the traces TL(2), TL(4) . . . , TL(14); within the circle area C8, the summation of the areas of the transmitting channel T(14) and the trace TL(14) is greater than the summation of the areas of the traces TL(2), TL(4), . . . , TL(12).

Figure 14:
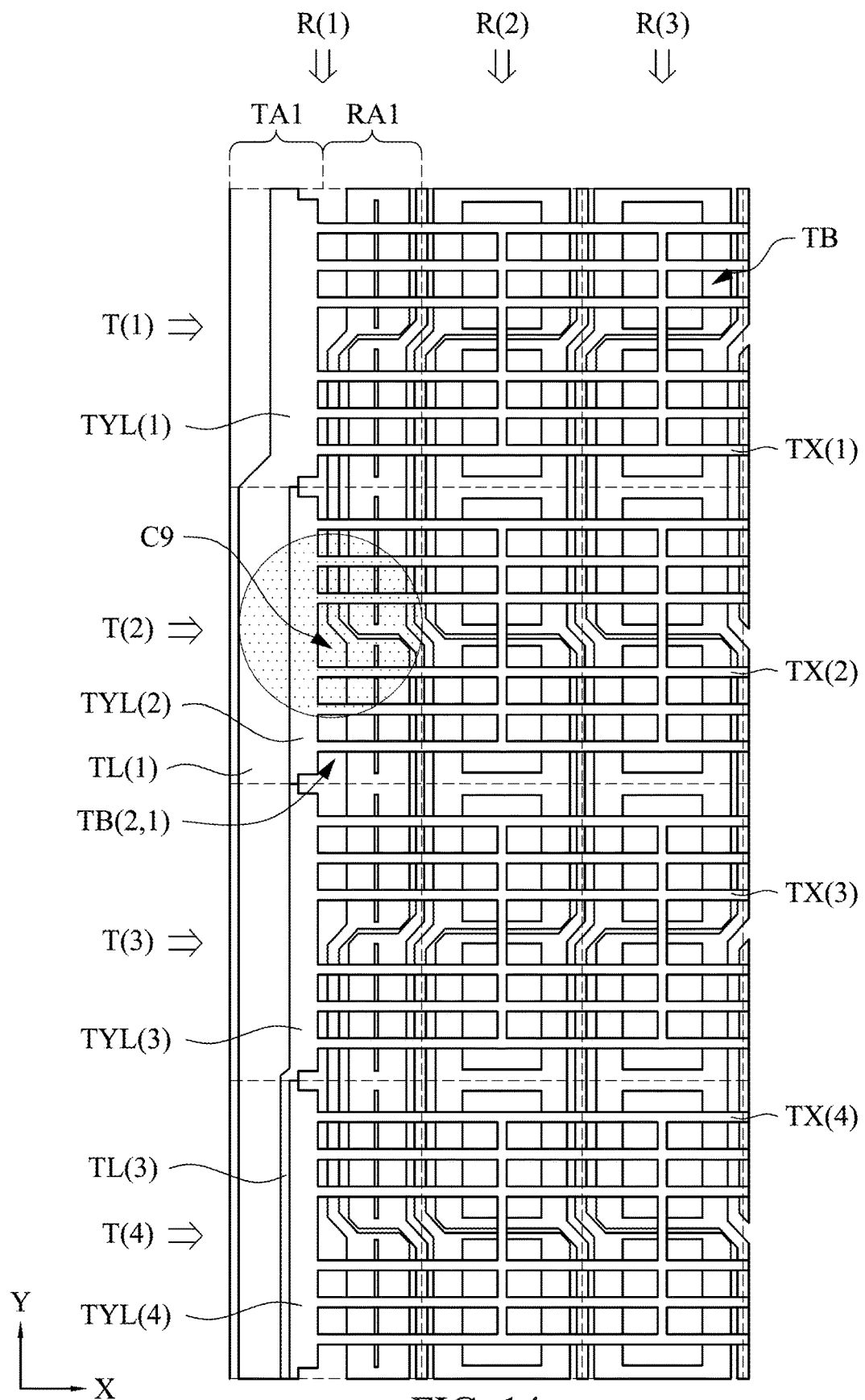
FIGS. 14 and 15 are enlarged views of respective portions of the touch panel in FIG. 1 in accordance with some exemplarily implementations.
Figure 15:
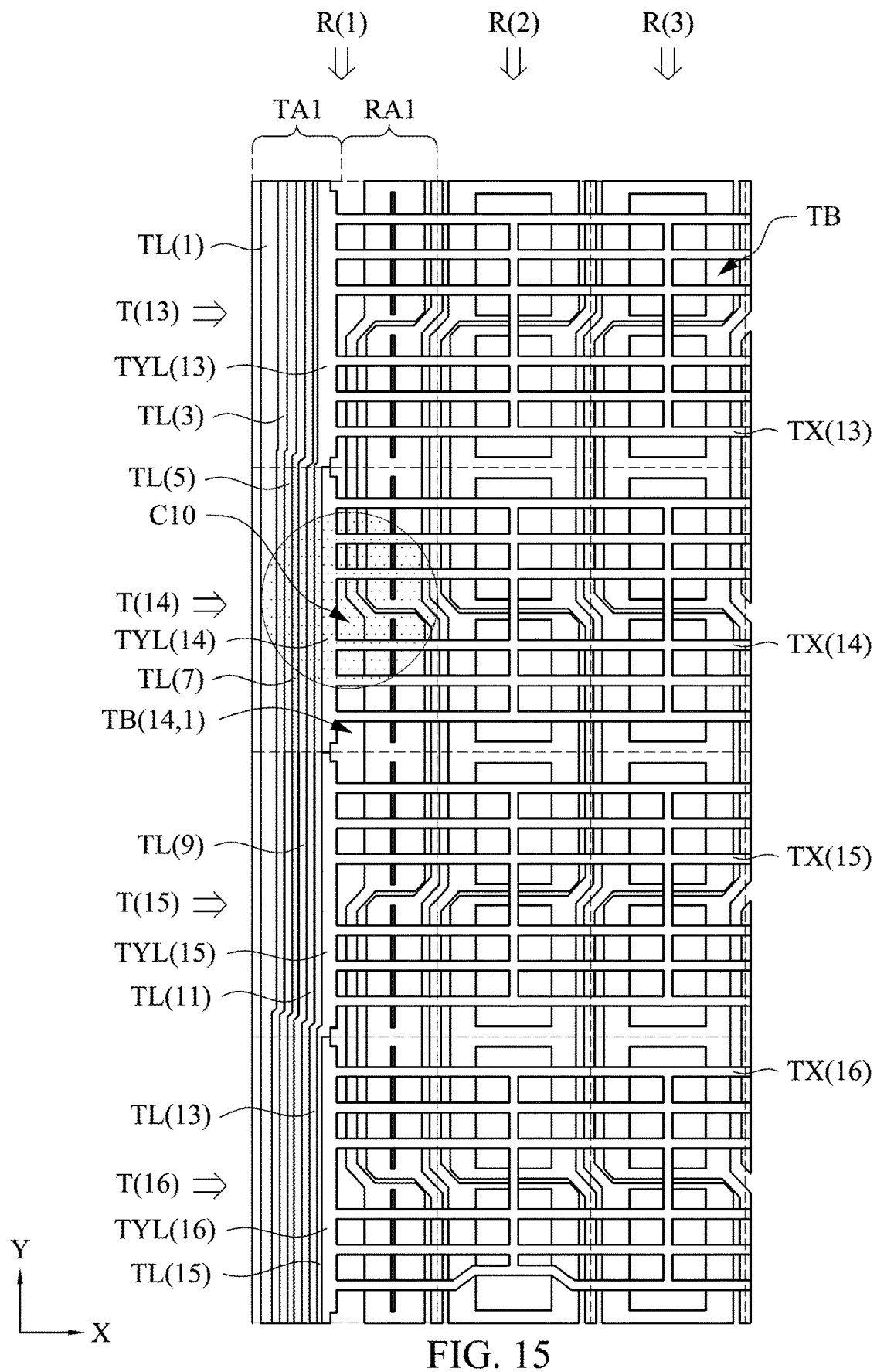

FIG. 14 to FIG. 15 are enlarged views of respective portions of the touch panel 100 for a second exemplarily example. In the second exemplarily example, each transmitting channel has 6 main branches and two peripheral branches respectively at the left and right sides of the touch active area 110. For illustration, as shown in FIG. 14, the transmitting channel T(1)/T(2)/T(3)/T(4) includes 6 main branches TX(1)/TX(2)/TX(3)/TX(4) and a peripheral branch TYL(1)/TYL(2)/TYL(3)/TYL(4) in the touch detection block TB(1,1)/TB(2,1)/TB(3,1)/TB(4,1), and as shown in FIG. 15, the transmitting channel T(13)/T(14)/T(15)/T(16) includes 6 main branches TX(13)/TX(14)/TX(15)/TX(16) and a peripheral branch TYL(13)/TYL(14)/TYL(15)/TYL(16) in the touch detection block TB(13,1)/TB(14,1)/TB(15,1)/TB(16,1). In comparison with the first exemplarily example, the touch panel 100 for the second the exemplary example may provide more area of each touch detection block TB for touch detection. The arrangements of the touch detection blocks and the traces for the second exemplarily example is similar to those for the first exemplarily examples, and thus detailed descriptions are not repeated herein. In various embodiments, the transmitting channels T(1)-T(16) may have the same number or different numbers of main branches.

Table 1 shows a touch detection testing result of the touch panel 100 on which the touch area is the circle area C9 shown in FIG. 14, and Table 2 shows a touch detection testing result of the touch panel 100 on which the touch area is the circle area C10 shown in FIG. 15. In Tables 1 and 2, the rows respectively represent the transmitting channels, the columns respectively represent the receiving channels, the first half and the second half in each odd-numbered transmitting channel respectively correspond to the first receiving electrode and the second receiving electrode of each receiving channel, and the first half and the second half in each even-numbered transmitting channel respectively correspond to the second receiving electrode and the first receiving electrode of each receiving channel. The area of each of the circle areas C9-C10 may be the same as that of the circle area C1. In the touch detection tests, the diameter each of the circle areas C9-C10 is 5 mm, the summation of the areas of the main branches TX(2) and the peripheral branch TYL(2) in the transmitting channel T(2) within the circle area C9 is about 7.64 mm², the area of the trace TL(1) within the circle area C9 is about 2.06 mm², the summation of the areas of the main branches TX(14) and the peripheral branch TYL(14) in the transmitting channel T(14) within the circle area C10 is about 5.19 mm², and the summation of the areas of the traces TL(1), TL(3), . . . , TL(13) within the circle area C10 is about 4.05 mm².

TABLE 1

|  |  | 1st Column | 2nd Column | 3rd Column | TX Self-Capacitance |
|---|---|---|---|---|---|
| 1st Row | First Half | 5 | 2 | 1 | 41 |
|  | Second Half | 9 | 3 | 2 | 41 |
| 2nd Row | First Half | 21 | 10 | 3 | 68 |
|  | Second Half | 53 | 6 | 2 | 68 |
| 3rd Row | First Half | 4 | 2 | 4 | 18 |
|  | Second Half | 4 | 2 | 3 | 18 |
| 4th Row | First Half | 2 | 1 | 1 | 4 |
|  | Second Half | 1 | 1 | 1 | 4 |
| RX Self-Capacitance |  | 42 | 9 | 7 |  |

TABLE 2

|  |  | 1st Column | 2nd Column | 3rd Column | TX Self-Capacitance |
|---|---|---|---|---|---|
| 12th Row | First Half | 2 | 2 | 2 | 0 |
|  | Second Half | 2 | 2 | 1 | 0 |
| 13th Row | First Half | 3 | 2 | 2 | 3 |
|  | Second Half | 5 | 2 | 2 | 3 |
| 14th Row | First Half | 62 | 11 | 3 | 37 |
|  | Second Half | 47 | 7 | 2 | 37 |
| 15th Row | First Half | 3 | 3 | 2 | 0 |
|  | Second Half | 2 | 2 | 2 | 0 |
| RX Self-Capacitance |  | 37 | 5 | 3 |  |

As can be seen from Table 1, when an object touches the touch panel 100 on the touch detection block TB(2,1) (as in the circle area C9 shown in FIG. 14), the mutual capacitance characteristic values corresponding to the transmitting channel T(2) and the receiving channel R(1), i.e. corresponding to the touch detection block TB(2,1), are greater than those of the other touch detection blocks, the transmitting channel (TX) self-capacitance characteristic values of the transmitting channel T(2) are greater than those of the other transmitting channels, and the receiving channel (RX) self-capacitance characteristic value of the receiving channel R(1) is greater than those of the other receiving channels. Similarly, as can be seen from Table 2, when an object touches the touch panel 100 on the touch detection block TB(14,1) (as in the circle area C10 shown in FIG. 15), the mutual capacitance characteristic values corresponding to the transmitting channel T(14) and the receiving channel R(1), i.e. corresponding to the touch detection block TB(14, 1), are greater than those of the other touch detection blocks, the transmitting channel self-capacitance characteristic values of the transmitting channel T(14) are greater than those of the other transmitting channels, and the receiving channel self-capacitance characteristic value of the receiving channel R(1) is greater than those of the other receiving channels. It is noted for illustrative purposes, the mutual capacitance characteristic values corresponding to the touch detection blocks in the transmitting channels T(5)-T(16) and/or in the receiving channels R(4)-R(M), the transmitting channel self-capacitance characteristic values corresponding to the transmitting channels T(5)-T(16) and the transmitting channel self-capacitance characteristic values corresponding to the receiving channels R(4)-R(M) are not shown in Table 1, and the mutual capacitance characteristic values corresponding to the touch detection blocks in the transmitting channels T(1)-T(11), T(16) and in the receiving channels R(4)-R(M), the transmitting channel self-capacitance characteristic values corresponding to the transmitting channels T(1)-T(11), T(16) and the transmitting channel self-capacitance characteristic values corresponding to the receiving channels R(4)-R(M) are not shown in Table 2. Tables 1 and 2 reveal that the touch panel 100 in accordance of embodiments of the invention achieves accurate edge touch detection.

Figure 16:
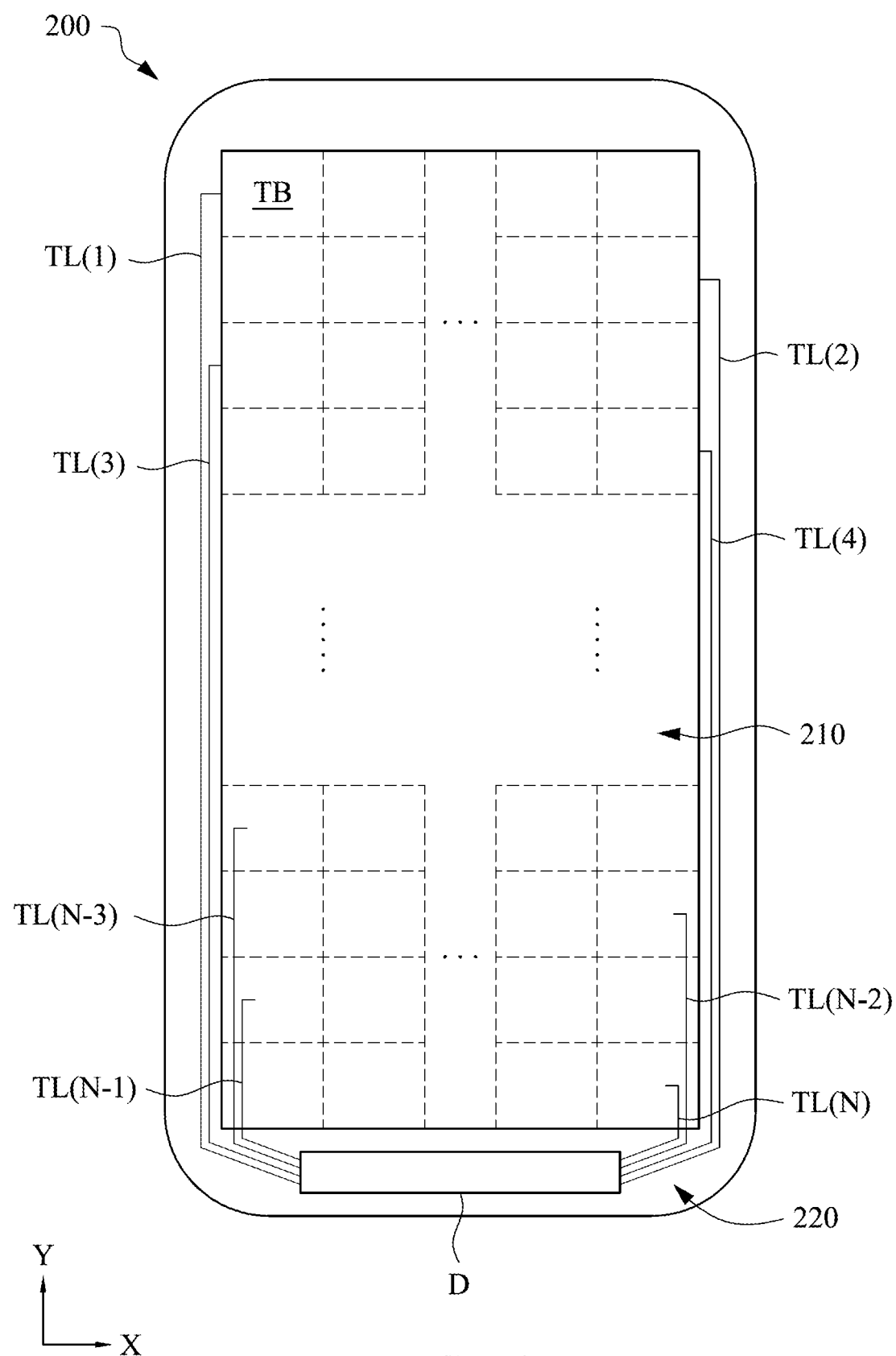
FIG. 16 is a schematic diagram of a touch panel in accordance with some embodiments of the invention.

FIG. 16 is a schematic diagram of a touch panel 200 in accordance with some embodiments of the invention. Similar to the touch panel 100 shown in FIG. 1, the touch panel 200 has a touch active area 210 with touch detection blocks TB arranged as a matrix of N rows and M columns for detecting a touch operation and a peripheral area 220, and a driving circuit D is electrically connected to the touch detection blocks TB for transmitting driving signals respectively to the rows of the touch detection blocks TB through traces TL(1)-TL(N) and receiving detection signals respectively from the columns of the touch detection blocks TB. The N rows of the touch detection blocks TB are also referred to as transmitting channels T(1)-T(N). As shown in FIG. 16, the traces TL(1)-TL(N) are separated as odd-numbered traces TL(1), TL(3), . . . , TL(N−1) respectively corresponding to odd-numbered rows of the touch detection blocks TB and even-numbered traces TL(2), TL(4), . . . , TL(N) respectively corresponding to even-numbered rows of the touch detection blocks TB. The odd-numbered traces TL(1), TL(3), . . . , TL(N−1) and the even-numbered traces TL(2), TL(4), . . . , TL(N) are arranged respectively at two opposite sides of the touch panel 200.

In comparison to the touch panel 100 in FIG. 1, in the touch panel 200, some of the traces TL(1)-TL(N) extend into the touch active area 210, and the others are completely in the peripheral area 220. In particular, some of the odd-numbered traces TL(1), TL(3), . . . , TL(N−1) extend into the leftmost column of the touch detection blocks TB, and some of the even-numbered traces TL(2), TL(4), . . . , TL(N) extend into the rightmost column of the touch detection blocks TB. In a case where the traces TL(K+1)-TL(N) (0<K<N) extend into the touch active area 210 and neither of the traces TL(1)-TL(K) extends into the touch active area 210, each of the transmitting channels T(1)-T(K) may have only main branches but not have a peripheral branch, the traces TL(1)-TL(K) may be alternatively formed from metal such as silver, copper, gold, etc., and the transmitting channels T(K+1)-T(N) may be similar to the transmitting channels T(1)-T(N−K) of the touch panel 100. The middle columns of touch detection blocks TB in the touch panel 200 may be the same as or similar to those in the touch panel 100, and thus detailed descriptions are not repeated herein.

Figure 17:
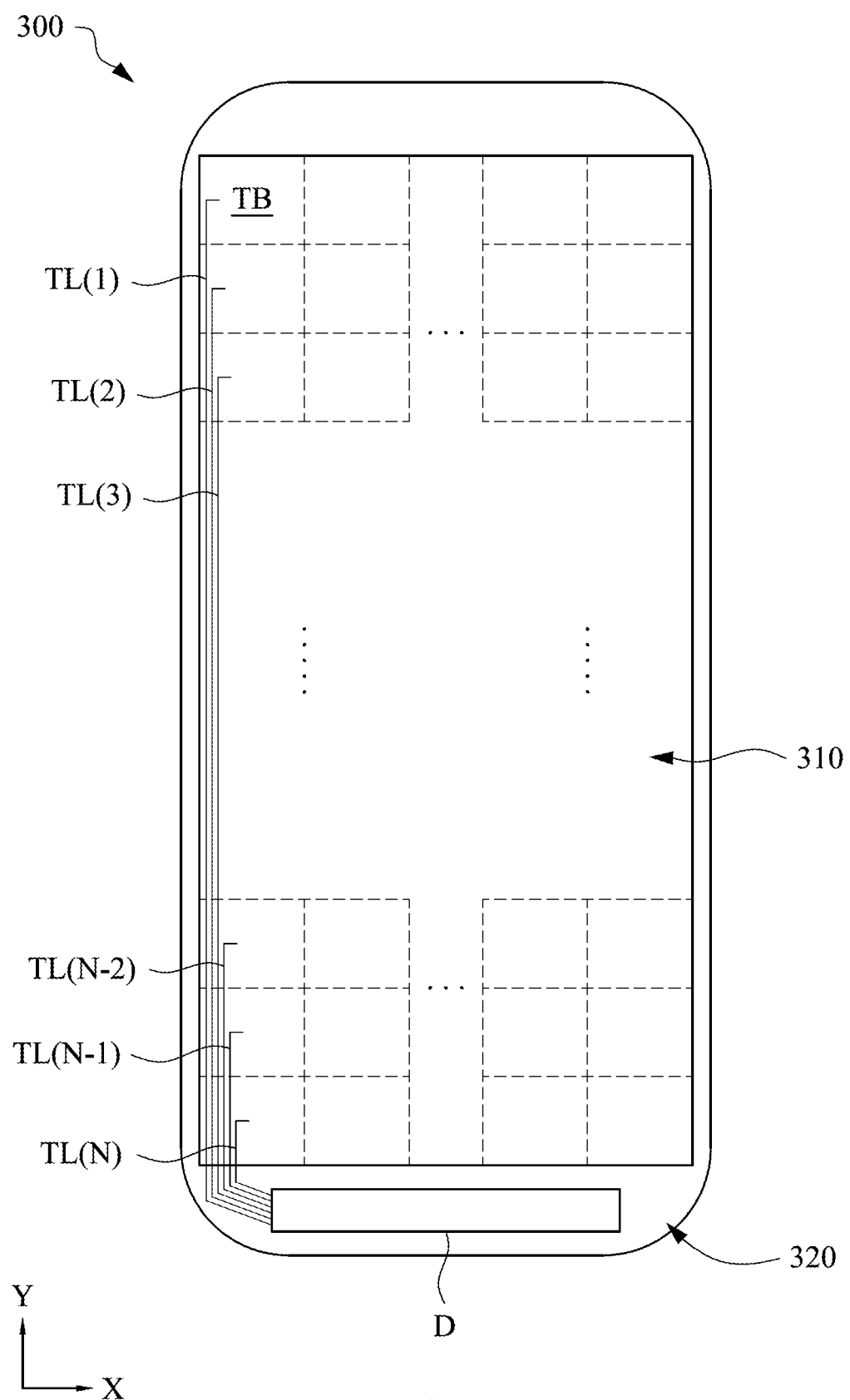
FIG. 17 is a schematic diagram of a touch panel in accordance with some embodiments of the invention.

FIG. 17 is a schematic diagram of a touch panel 300 in accordance with some embodiments of the invention. The touch panel 300 has a touch active area 310 and a peripheral area 320. In the touch active area 310, touch detection blocks TB are arranged as a matrix of N rows and M columns for detecting a touch operation. A driving circuit D is disposed for transmitting driving signals respectively to rows of the touch detection blocks TB and receiving detection signals respectively from columns of the touch detection blocks TB. The driving circuit D may provide the driving signals through traces TL(1)-TL(N) which respectively coupled to the rows of the touch detection blocks TB. The N rows of touch detection blocks TB are also referred to as transmitting channels T(1)-T(N). As shown in FIG. 17, all traces TL(1)-TL(N) are arranged at the left side edge of the touch panel 300 and extend into the leftmost column of the touch detection blocks TB. In other words, each of the traces TL(1)-TL(N) has a portion that belong to the leftmost column of the touch detection blocks TB.

Figure 18:
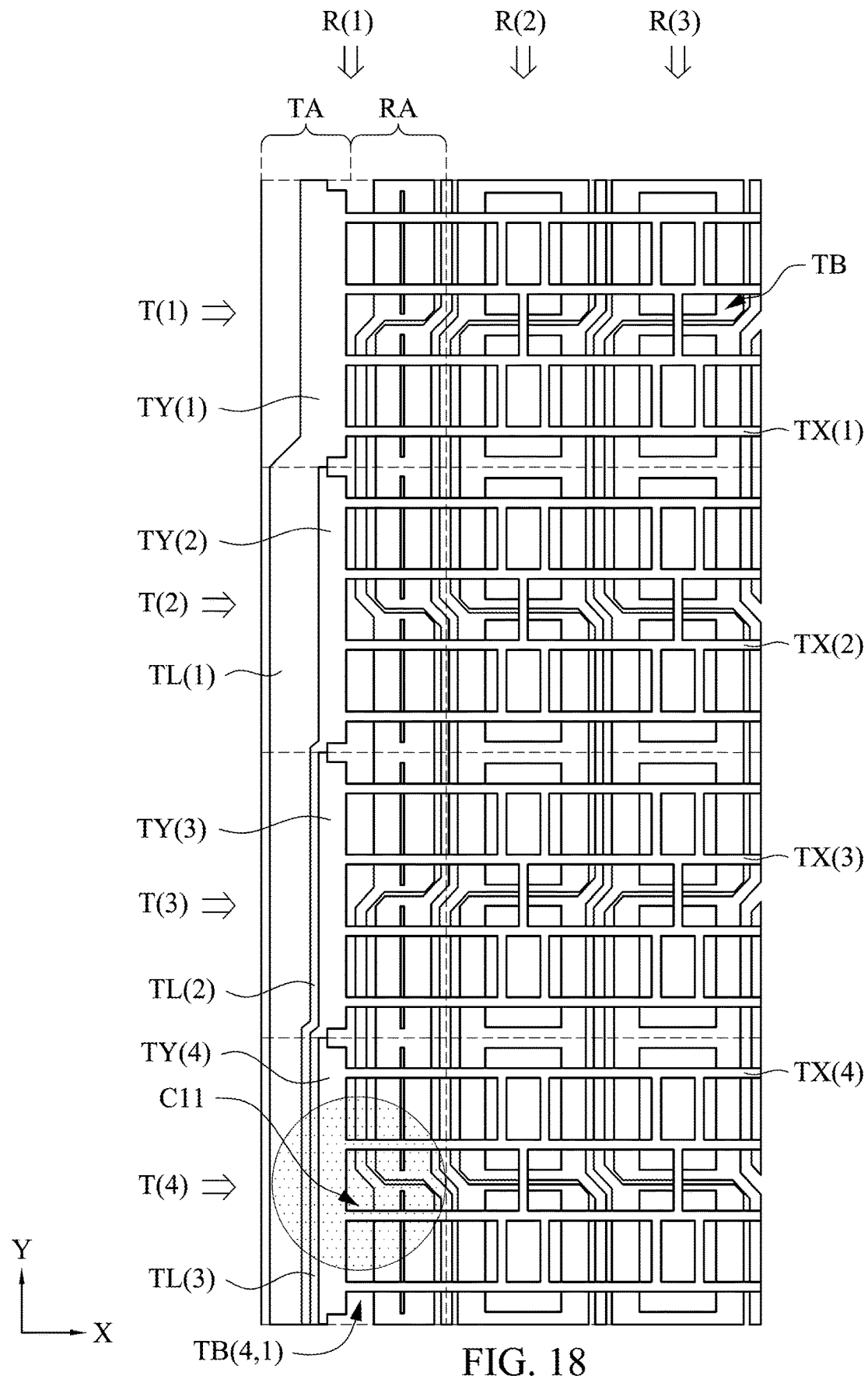
FIG. 18 is an enlarged view of a portion of the touch panel in FIG. 17 in accordance with some exemplarily implementations.

FIG. 18 is an enlarged view of a portion of the touch panel 300 for an exemplarily example. In particular, FIG. 18 shows the leftmost three columns and the 1$^{st}$ to 4$^{th}$ rows of the touch detection blocks TB. In each touch detection block TB, the transmitting electrode is vertically overlapped with the receiving electrodes. The transmitting electrodes of the touch detection blocks TB and the traces TL(1)-TL(N) belong to a first electrode layer, while the receiving electrodes of the touch detection blocks TB belong to a second electrode layer. In comparison with the touch panel 100, in the touch panel 300, each of the transmitting channels T(1)-T(16) includes a peripheral branch in the leftmost column of the touch detection blocks TB and connecting to a corresponding one of the traces TL(1)-TL(N). That is, each of the touch detection blocks TB in the leftmost column has a peripheral branch similar to, for example, the peripheral branch TYL(3) shown in FIG. 6. In some embodiments, each of the transmitting channels T(1)-T(16) may include another peripheral branch in the rightmost column of the touch detection blocks TB, similar to, for example, the peripheral branch TYR(3) shown in FIG. 10. The middle columns of touch detection blocks TB in the touch panel 300 may be the same as or similar to those in the touch panel 100, and thus detailed descriptions are not repeated herein.

It is noted that although only some of the touch detection blocks TB of the touch panel 300 are shown in FIG. 18 for illustrative purposes, it can be known from the context that each of the other touch detection blocks TB also has a similar arrangement to that shown in FIG. 18.

For the touch panel 300, a circle area within one of the leftmost column of touch detection blocks TB and of which the diameter is approximately the same as the width of the underlying edge touch detection block TB meets the following condition: within the circle area, a summation of areas of the corresponded transmitting channel and the trace coupled to the corresponded transmitting channel is substantially larger than a summation of areas of the other transmitting channels and the other traces. For example, FIG. 18 also shows a circle area C11 equivalent to the area of the touch panel 300 touched by an object within the touch detection block TB(4,1) and of which the diameter is approximately the same as the width of the touch detection block TB(4,1). For the touch detection block TB(4,1), a summation of the areas of the transmitting electrode TE in the transmitting channel TX(4) and the trace TL(4) in the circle area C11, i.e. a summation of the areas of the main branches TX(4) and the peripheral branch TY(4) in the circle area C11, is substantially larger than a summation of the areas of the transmitting channels TX(1)-TX(3), TX(5)-TX(16) and the traces TL(1)-TL(3), TL(5)-TL(16) in the circle area C11. Since the transmitting channels TX(1)-TX(3), TX(5)-TX(16) and the traces TL(5)-TL(16) are neither overlapped with the circle area C11, the condition can be simplified as: a summation of the areas of the transmitting electrode TE in the transmitting channel TX(4) and the trace TL(4) is substantially larger than a summation of areas of the traces TL(1)-TL(3). If the width of the touch detection block TB(4,1) is 2.5-5 mm, then the diameter of the circle area C11 may also be approximately 2.5-5 mm.

The touch panel 300 in FIG. 17 may be modified in accordance with some embodiments. For example, all traces TL(1)-TL(N) may be arranged at the right side edge of the touch panel 300 and extend into the rightmost column of the touch detection blocks TB. In this case, each of the traces TL(1)-TL(N) has a portion that belong to the rightmost column of the touch detection blocks TB, and each of the transmitting channels includes a peripheral branch in the rightmost column of the touch detection blocks TB and connecting to a corresponding one of the traces TL(1)-TL(N). That is, each of the touch detection blocks TB in the rightmost column has a peripheral branch similar to, for example, the peripheral branch TYR(14) shown in FIG. 13. In certain embodiments, each of the transmitting channels T(1)-T(16) may include another peripheral branch in the leftmost column of the touch detection blocks TB, similar to, for example, the peripheral branch TYL(2) shown in FIG. 7.

Figure 19:
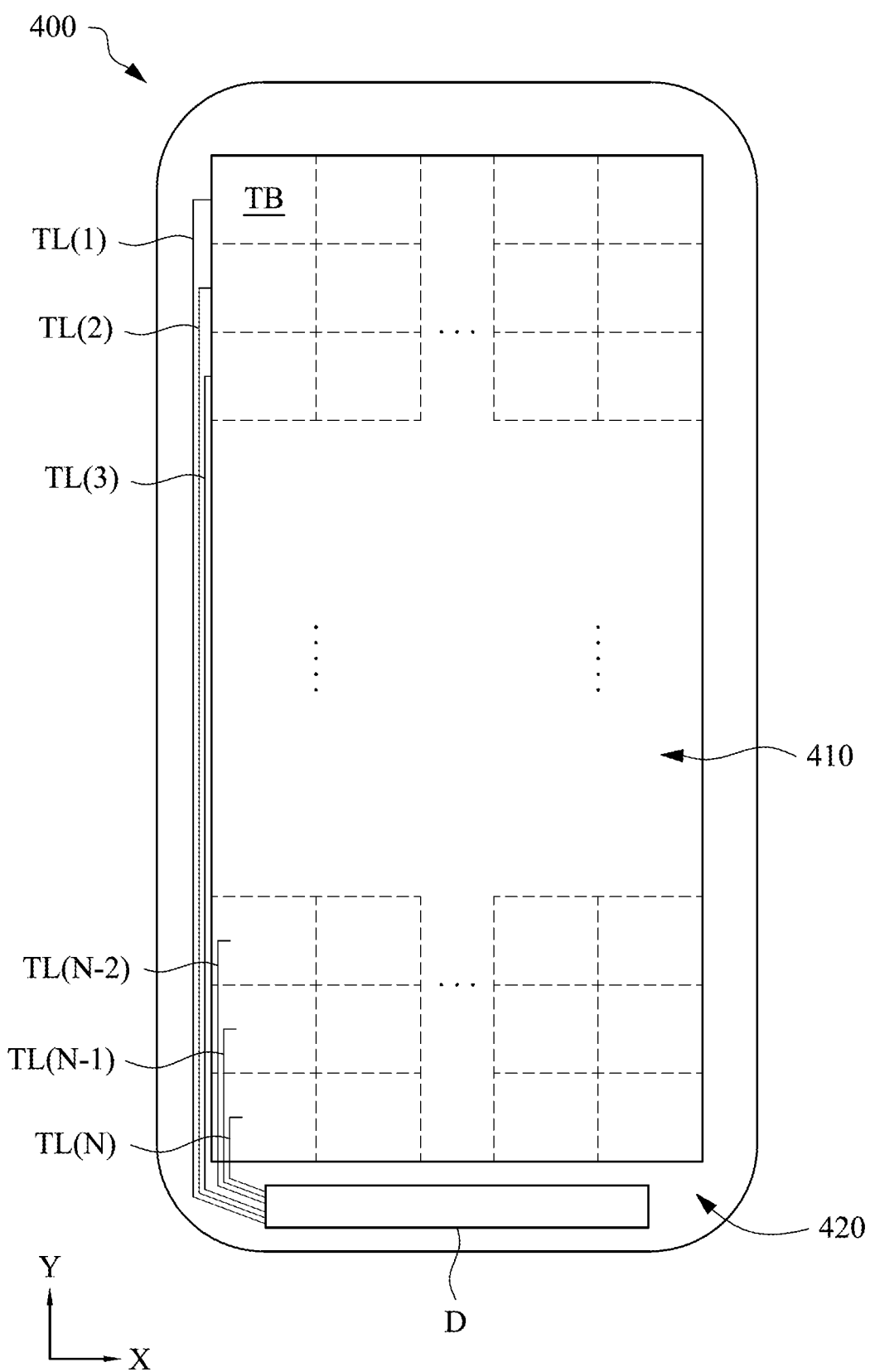
FIG. 19 is a schematic diagram of a touch panel in accordance with some embodiments of the invention.

FIG. 19 is a schematic diagram of a touch panel 400 in accordance with some embodiments of the invention. Similar to the touch panel 300 shown in FIG. 17, the touch panel 400 has a touch active area 410 with touch detection blocks TB arranged as a matrix of N rows and M columns for detecting a touch operation and a peripheral area 420, and a driving circuit D is electrically connected to the touch detection blocks TB for transmitting driving signals respectively to the rows of the touch detection blocks TB through traces TL(1)-TL(N) and receiving detection signals respectively from the columns of the touch detection blocks TB. The N rows of touch detection blocks TB are also referred to as transmitting channels T(1)-T(N). As shown in FIG. 19, all traces TL(1)-TL(N) are arranged at the left side edge of the touch panel 400, and in comparison with the touch panel 300 in FIG. 17, in the touch panel 400, some of the traces TL(1)-TL(N) extend into the touch active area 410, and the others are completely in the peripheral area 420. In other words, only some of the traces TL(1)-TL(N) extend into the leftmost column of the touch detection blocks TB. In a case where the traces TL(K+1)-TL(N) (0<K<N) extend into the touch active area 410 and neither of the traces TL(1)-TL(K) extends into the touch active area 410, each of the transmitting channels T(1)-T(K) may have only main branches but not have a peripheral branch, the traces TL(1)-TL(K) may be alternatively formed from metal such as silver, copper, gold, etc., and the transmitting channels T(K+1)-T (N) may be similar to the transmitting channels T(1)-T(N−K) of the touch panel 300. The other columns of touch detection blocks TB in the touch panel 400 may be the same as or similar to those in the touch panel 300, and thus detailed descriptions are not repeated herein.

Figure 20:
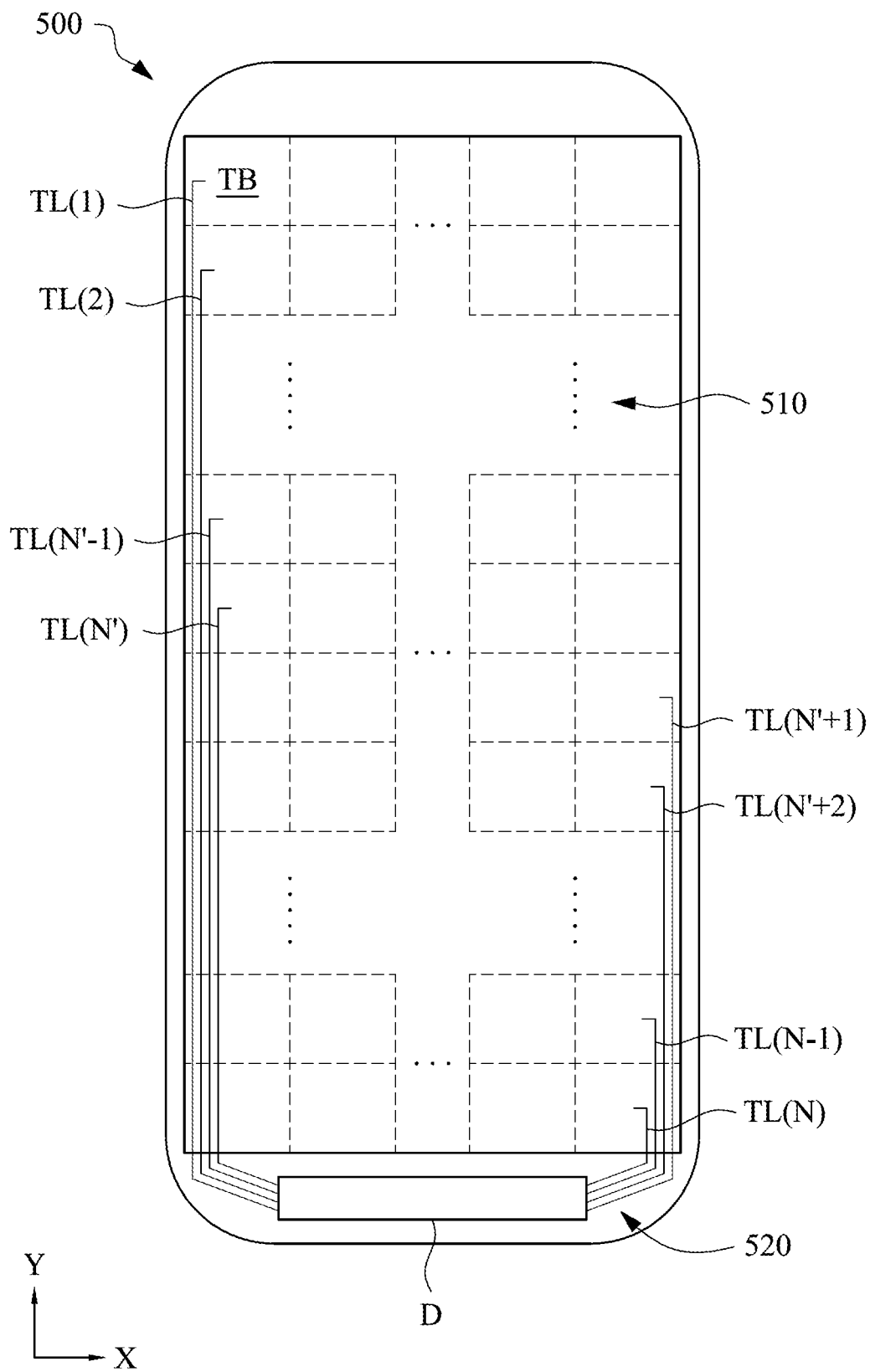
FIG. 20 is a schematic diagram of a touch panel in accordance with some embodiments of the invention.

FIG. 20 is a schematic diagram of a touch panel 500 in accordance with some embodiments of the invention. The touch panel 500 has a touch active area 510 with touch detection blocks TB arranged as a matrix of N rows and M columns for detecting a touch operation and a peripheral area 520, and a driving circuit D is electrically connected to the touch detection blocks TB for transmitting driving signals respectively to the rows of the touch detection blocks TB through traces TL(1)-TL(N) and receiving detection signals respectively from the columns of the touch detection blocks TB. The N rows of touch detection blocks TB are also referred to as transmitting channels T(1)-T(N). As shown in FIG. 20, the traces TL(1)-TL(N) are separated as first traces TL(1)-TL(N') respectively corresponding to $1^{st}$ to $(N')^{th}$ rows of the touch detection blocks TB and second traces TL(N'+1)-TL(N) respectively corresponding to $(N'+1)^{th}$ to $N^{th}$ rows of the touch detection blocks TB. The first traces TL(1)-TL(N') are arranged at the left side of the touch panel 500, and the second traces TL(N'+1)-TL(N) are arranged at the right side of the touch panel 500. The transmitting channels T(1)-T(N') of the touch panel 500 may be arranged in a manner similar to the odd-numbered transmitting channels T(1), T(3), . . . , T(15) of the touch panel 100, and the transmitting channels T(N'+1)-T(N) of the touch panel 500 may be arranged in a manner similar to the even-numbered transmitting channels T(2), T(4), . . . , T(16) of the touch panel 100. In particular, in a case where N' is 8 and N is 16, the transmitting channels T(1)-T(8) of the touch panel 500 are respectively similar to the odd-numbered transmitting channels T(1), T(3), . . . , T(15) of the touch panel 100, and the transmitting channels T(9)-T(16) of the touch panel 500 are respectively similar to the even-numbered transmitting channels T(2), T(4), . . . , T(16) of the touch panel 100.

Figure 21:
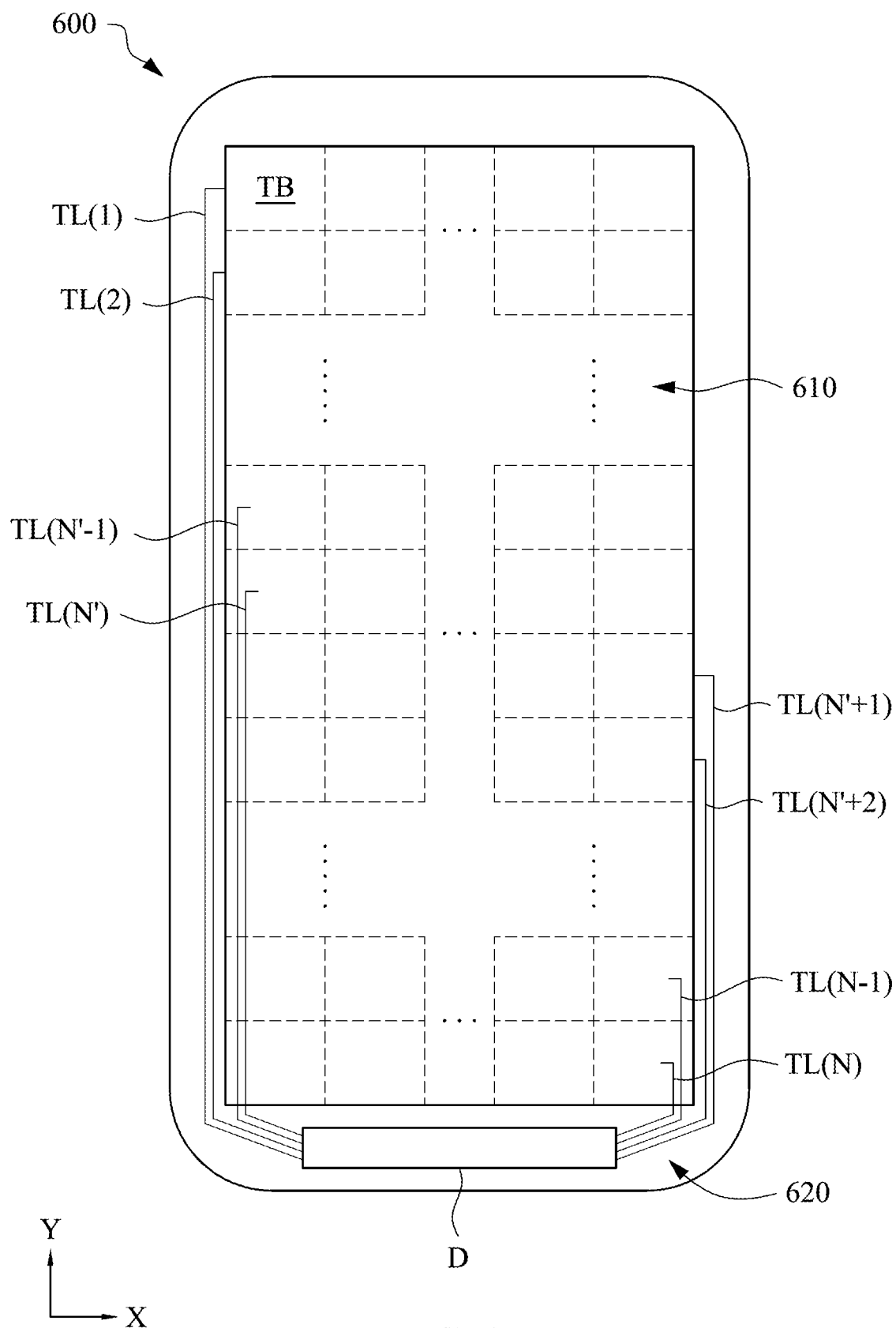
FIG. 21 is a schematic diagram of a touch panel in accordance with some embodiments of the invention.

FIG. 21 is a schematic diagram of a touch panel 600 in accordance with some embodiments of the invention. Similar to the touch panel 500 shown in FIG. 20, the touch panel 600 has a touch active area 610 with touch detection blocks TB arranged as a matrix of N rows and M columns for detecting a touch operation and a peripheral area 620, and a driving circuit D is electrically connected to the touch detection blocks TB for transmitting driving signals respectively to the rows of the touch detection blocks TB through traces TL(1)-TL(N) and receiving detection signals respectively from the columns of the touch detection blocks TB. The N rows of touch detection blocks TB are also referred to as transmitting channels T(1)-T(N). As shown in FIG. 21, the traces TL(1)-TL(N) are separated as first traces TL(1)-TL(N') respectively corresponding to $1^{st}$ to $(N')^{th}$ rows of the touch detection blocks TB and second traces TL(N'+1)-TL(N) respectively corresponding to $(N'+1)^{th}$ to $N^{th}$ rows of the touch detection blocks TB. In comparison with the touch panel 500 in FIG. 20, in the touch panel 600, some of the first traces TL(1)-TL(N') and some of the second traces TL(N'+1)-TL(N) extend into the touch active area 610, while the others are completely in the peripheral area 620. In other words, only some of the first traces TL(1)-TL(N') extend into the leftmost column of the touch detection blocks TB, and only some of the second traces TL(N'+1)-TL(N) extend into the rightmost column of the touch detection blocks TB. In a case where the first traces TL($K_1$+1)-TL(N') (0<$K_1$<N') and the second traces TL($K_2$+1)-TL(N) (N'<$K_2$<N) extend into the touch active area 610 and neither of the first traces TL(1)-TL($K_1$) and the second traces TL(N'+1)-TL($K_2$) extends into the touch active area 610, each of the transmitting channels T(1)-T($K_1$), T(N'+1)-T($K_2$) may have only main branches but not have a peripheral branch, the first traces TL(1)-TL($K_1$) and the second traces TL(N'+1)-TL($K_2$) may be alternatively formed from metal such as silver, copper, gold, etc., the transmitting channels T($K_1$+1)-T(N') may be similar to the transmitting channels T(1)-T(N'−$K_1$) of the touch panel 500, and the transmitting channels T($K_2$+1)-T(N) may be similar to the transmitting channels T(N'+1)-T(N'+N−$K_2$) of the touch panel 500.

Figure 22:
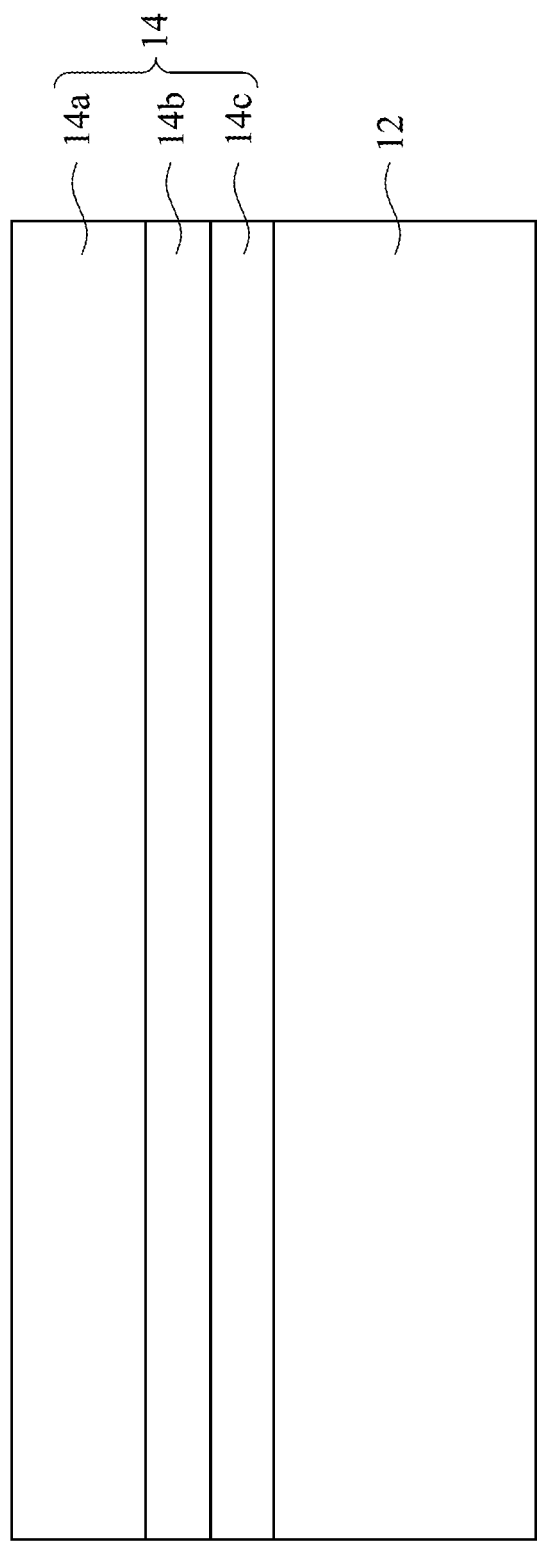
FIG. 22 is a touch display apparatus in accordance with some embodiments of the invention.

FIG. 22 is a touch display apparatus 10 in accordance with some embodiments of the invention. The touch display apparatus 10 may be a part of a tablet, a notebook, a laptop PC, an LCD or OLED TV, a handset device or a GPS navigator including at least display and touch detection functions, but is not limited thereto. The touch display apparatus 10 includes an out-cell touch display panel with a display panel 12 and a touch panel 14 disposed over the display panel 12. A further adhesive layer (not shown) may be interposed between the display panel 12 and the touch panel 14 for assembling the touch panel 14 and the display panel 12. In particular, the display panel 12 has a display area for image display, the touch panel 14 has a touch active area for touch detection, and the display area of the display panel 12 is aligned with the touch active area of the touch panel 14.

The display panel 12 may be any type of LCD panel, inorganic LED display panel, OLED display panel or another suitable display panel. The touch panel 14 has two electrode layers for touch detection and may be one of the touch panels 100, 200, 300, 400, 500, 600 illustrated above, or alternatively another similar touch panel. The touch panel 14 may also be referred to as a glass-film-film (G/F/F) type touch panel, which includes a cover substrate 14a and a first electrode layer 14b and a second electrode layer 14c sequentially stacked on the cover substrate 14a. The cover substrate 14a provides at least a protection function and a touch operation interface. The first electrode layer 14b has transmitting electrodes and traces, and the second electrode layer 14c has receiving electrodes. The transmitting electrodes, the traces and the receiving electrodes of the touch panel 14 may be similar to those in any of the embodiments of the touch panels 100, 200, 300, 400, 500, 600 described above. For example, in a case where the touch panel 14 is implemented as the touch panel 100, the first electrode layer 14b and the second electrode layer 14c respectively correspond to the first electrode layer and the second electrode layer of the touch panel. In alternative embodiments, the second electrode layer 14c and the first electrode layer 14b are sequentially stacked on the cover substrate 14a, such that the receiving electrodes are nearer to the touch surface of the touch panel than the transmitting electrodes and the traces.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:
1. A touch panel, comprising:
 a first electrode layer having transmitting electrodes and a plurality of traces, wherein the transmitting electrodes are arranged in a plurality of transmitting channels, and the traces are respectively coupled to the transmitting channels, and a longitudinal extending direction of the traces is perpendicular to a longitudinal extending direction of the transmitting electrodes; and a second electrode layer having receiving electrodes that are arranged in a plurality of receiving channels, wherein the receiving electrodes are vertically overlapped with the transmitting electrodes and vertically non-overlapped with the traces, and wherein a longitudinal extending direction of the receiving electrodes is perpendicular to the longitudinal extending direction of the transmitting electrodes and is parallel to the longitudinal extending direction of the traces;

wherein the transmitting channels, the receiving channels and the traces are arranged in a touch active area of the touch panel for touch sensing and form touch detection blocks that are arranged in a matrix, the traces are all arranged in a column of the matrix next to a side edge of the touch panel, and a width of the receiving electrodes in the column of the matrix next to the side edge of the touch panel is less than a width of the receiving electrodes in each of the other columns of the matrix not next to any side edge of the touch panel;

wherein for each touch detection block, within a maximum circle overlapped with at least one of the traces and substantially inscribed in the touch detection block corresponding to one of the transmitting channels, a summation of areas of the corresponded transmitting channel and the trace coupled to the corresponded transmitting channel is substantially larger than a summation of areas of the other transmitting channels and the other traces, wherein a diameter of the maximum circle is substantially the same as a width of the touch detection block.

2. The touch panel of claim 1, wherein the diameter of the maximum circle is at least 2.5 millimeters.

3. The touch panel of claim 2, wherein the diameter of the maximum circle is substantially 5 millimeters.

4. The touch panel of claim 1, wherein widths of the traces arranged in a direction from a nearest edge of the touch active area to a farthest edge of the touch active area opposite to the nearest edge are non-increasing.

5. The touch panel of claim 1, wherein the traces are transparent traces.

6. The touch panel of claim 1, wherein the transmitting electrodes and the receiving electrodes are transparent electrodes.

7. A touch panel, comprising:

a first electrode layer having transmitting electrodes and a plurality of first traces, wherein the transmitting electrodes are arranged in a plurality of first and second transmitting channels, and the first traces are respectively coupled to the first transmitting channels, and a longitudinal extending direction of the first traces is perpendicular to a longitudinal extending direction of the transmitting electrodes; and a second electrode layer having receiving electrodes that are arranged in a plurality of receiving channels, wherein the receiving electrodes are vertically overlapped with the transmitting electrodes and vertically non-overlapped with the first traces, and wherein a longitudinal extending direction of the receiving electrodes is perpendicular to the longitudinal extending direction of the transmitting electrodes and is parallel to the longitudinal extending direction of the first traces;

wherein the first and second transmitting channels, the receiving channels and the first traces are arranged in a touch active area of the touch panel for touch sensing and form first touch detection blocks that are arranged in a matrix, the first traces are all arranged in a first column of the matrix next to a first side edge of the touch panel, and a width of the receiving electrodes in the first column of the matrix next to the first side edge of the touch panel is less than a width of the receiving electrodes in each of the columns of the matrix not next to any side edge of the touch panel;

wherein for each first touch detection block, within a first maximum circle overlapped with at least one of the first traces and substantially inscribed in the first touch detection block corresponding to one of the first transmitting channels, a summation of areas of the first transmitting channel and the first trace coupled to the corresponded first transmitting channel is substantially larger than a summation of areas of the other first transmitting channels, the second transmitting channels and the other first traces, wherein a diameter of the first maximum circle is substantially the same as a width of the first touch detection block.

8. The touch panel of claim 7, wherein the first electrode layer further has a plurality of second traces respectively coupled to the second transmitting channels and opposite to the first traces with respect to the receiving channels, and a longitudinal extending direction of the second traces is perpendicular to the longitudinal extending direction of the transmitting electrodes and is parallel to the longitudinal extending direction of the receiving electrodes;

wherein the second traces are arranged in a second column of the matrix next to a second side edge of the touch panel opposite to the first side edge, the second traces are all arranged in a second column of the touch detection blocks that is closest to a second side edge of the touch panel opposite to the first side edge, and a width of the receiving electrodes in the second column of the matrix next to second side edge of the touch panel is less than the width of the receiving electrodes in each of the columns of the matrix not next to any side edge of the touch panel;

wherein for each second touch detection block, in a second maximum circle overlapped with at least one of the second traces and substantially inscribed in the second touch detection block corresponding to one of the second transmitting channels, a summation of areas of the second transmitting channel and the second trace coupled to the corresponded second transmitting channel is substantially larger than a summation of areas of the first transmitting channels, the other second transmitting channels and the other second traces, wherein a diameter of the second maximum circle is substantially the same as a width of the second touch detection block.

9. The touch panel of claim 8, wherein each of the diameter of the first maximum circle and the diameter of the second maximum circle is at least 2.5 millimeters.

10. The touch panel of claim 9, wherein each of the diameter of the first maximum circle and the diameter of the second maximum circle is substantially 5 millimeters.

11. The touch panel of claim 8, wherein the first and second transmitting channels are alternately arranged transmitting channels in the touch active area of the touch panel.

12. The touch panel of claim 8, wherein widths of the first traces arranged in a first direction from a first edge of the touch active area nearest to the first traces to a second edge of the touch active area nearest to the second traces are non-increasing, and widths of the second traces arranged in a second direction from the second edge of the touch active area to the first edge of the touch active area are non-increasing.

13. The touch panel of claim 8, wherein the first traces and the second traces are transparent traces.

14. The touch panel of claim 7, wherein the transmitting electrodes and the receiving electrodes are transparent electrodes.

15. A touch display apparatus, comprising:
   a display panel having a display area; and
   a touch panel stacked over the display panel, the touch panel comprising:
     a first electrode layer having transmitting electrodes and a plurality of traces, wherein the transmitting electrodes are arranged in a plurality of transmitting channels, and the traces are respectively coupled to the transmitting channels, and the transmitting electrodes and the traces are over the display area, and a longitudinal extending direction of the traces is perpendicular to a longitudinal extending direction of the transmitting electrodes; and
     a second electrode layer having receiving electrodes that are arranged in a plurality of receiving channels and over the display area, wherein the receiving electrodes are vertically overlapped with the transmitting electrodes and vertically non-overlapped with the traces, and wherein a longitudinal extending direction of the receiving electrodes is perpendicular to the longitudinal extending direction of the transmitting electrodes and is parallel to the longitudinal extending direction of the traces;
   wherein the transmitting channels, the receiving channels and the traces are arranged in an touch active area of the touch panel for touch sensing and form touch detection blocks that are arranged in a matrix, the traces are all arranged in a column of the matrix next to a side edge of the touch panel, and a width of the receiving electrodes in the column of the matrix next to the side edge of the touch panel is less than a width of the receiving electrodes in each of the other columns of the matrix not next to any side edge of the touch panel;
   wherein the display area of the display panel is aligned with the touch active area of the touch panel, and wherein for each touch detection block, in a maximum circle overlapped with at least one of the traces and substantially inscribed in the touch detection block corresponding to one of the transmitting channels, a summation of areas of the corresponded transmitting channel and the trace coupled to the corresponded transmitting channel is substantially larger than a summation of areas of the other transmitting channels and the other traces, wherein a diameter of the maximum circle is substantially the same as a width of the touch detection block.

16. The touch display apparatus of claim 15, wherein the display panel is a liquid crystal display (LCD) display panel, an inorganic light emitting diode display panel or an organic light emitting diode (OLED) display panel.

\* \* \* \* \*